United States Patent
Bergström et al.

(10) Patent No.: US 12,395,874 B2
(45) Date of Patent: Aug. 19, 2025

(54) USER EQUIPMENT (UE) REPORTING OF NON-CELLULAR RECEIVER STATUS

(71) Applicant: Telefonaktiebolaget LM Ericsson (publ), Stockholm (SE)

(72) Inventors: Mattias Bergström, Sollentuna (SE); Fredrik Gunnarsson, Linköping (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 329 days.

(21) Appl. No.: 18/020,811

(22) PCT Filed: Sep. 21, 2021

(86) PCT No.: PCT/SE2021/050913
§ 371 (c)(1),
(2) Date: Feb. 10, 2023

(87) PCT Pub. No.: WO2022/071844
PCT Pub. Date: Apr. 7, 2022

(65) Prior Publication Data
US 2023/0319606 A1    Oct. 5, 2023

Related U.S. Application Data

(60) Provisional application No. 63/085,358, filed on Sep. 30, 2020.

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
CPC .............................. H04W 24/08; H04W 24/10
See application file for complete search history.

(56) References Cited

U.S. PATENT DOCUMENTS 9,736,725 B2 *  8/2017  Kuo ...................... H04W 76/27
9,894,550 B2 *  2/2018  Jung ..................... H04W 24/02
(Continued)

FOREIGN PATENT DOCUMENTS

WO    2019160083 A1    8/2019

OTHER PUBLICATIONS

"3GPP TS 32.422 V16.0.0", 3rd Generation Partnership Project; Technical Specification Group Services and System Aspects; Telecommunication management; Subscriber and equipment trace; Trace control and configuration management (Release 16), Dec. 2019, pp. 1-197.
(Continued)

*Primary Examiner* — Lewis G West
(74) *Attorney, Agent, or Firm* — Murphy, Bilak & Homiller, PLLC

(57) ABSTRACT

Embodiments include methods for a user equipment (UE) configured to operate in a cellular radio access network (RAN). Such methods include receiving, from the cellular RAN, a measurement reporting configuration comprising identification of non-cellular signals, of one or more types, for which measurements are requested from the UE. Such methods include measuring at least the identified non-cellular signals and transmitting, to the cellular RAN, a measurement report including one or more of the following for each particular type of identified non-cellular signal: a first indication of whether the UE's corresponding non-cellular receiver was enabled during a measurement duration, and a second indication of whether the UE was out-of-coverage during the measurement duration in relation (Continued)

to all identified non-cellular signals of the particular type. Other embodiments include complementary methods for a network node, as well as UEs and network nodes configured to perform such methods.

20 Claims, 16 Drawing Sheets

(56) References Cited

U.S. PATENT DOCUMENTS

| | | | | |
|---|---|---|---|---|
| 2014/0161103 | A1* | 6/2014 | Sirotkin | H04W 36/0088 370/332 |
| 2015/0078153 | A1* | 3/2015 | Kuo | H04W 28/0942 370/329 |
| 2016/0080958 | A1* | 3/2016 | Rinne | H04W 24/10 370/338 |
| 2016/0302245 | A1* | 10/2016 | Bergström | H04W 76/18 |
| 2017/0026929 | A1* | 1/2017 | Grischy | H04W 24/10 |
| 2018/0227812 | A1* | 8/2018 | Nagasaka | H04W 48/18 |
| 2018/0242386 | A1* | 8/2018 | Ke | H04W 8/24 |
| 2018/0343578 | A1* | 11/2018 | Yeoh | H04W 24/10 |
| 2019/0059048 | A1* | 2/2019 | Yeoh | H04W 24/10 |
| 2020/0359251 | A1* | 11/2020 | Gunnarsson | H04W 24/10 |
| 2021/0185745 | A1* | 6/2021 | Chinnakkannu | H04W 76/16 |
| 2021/0243625 | A1* | 8/2021 | Hong | H04B 17/318 |

OTHER PUBLICATIONS

"3GPP TS 36.300 V16.2.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Jul. 2020, pp. 1-390.

"Additional UE capability bits for WLAN/BT measurements in MDT", 3GPP TSG-RAN WG2 #101 Bis, Tdoc R2-1805377, Sanya, China, Apr. 16-20, 2018, pp. 1-2.

"3GPP TS 36.331 V15.7.0", 3rd Generation Partnership Project; Technical Specification Group Radio Access Network; Evolved Universal Terrestrial Radio Access (E-UTRA); Radio Resource Control (RRC); Protocol specification (Release 15), Sep. 2019, pp. 1-962.

"3GPP TS 36.133 V16.5.0", 3rd Generation Partnership Project; Technical Specification Group Radio Access Network; Evolved Universal Terrestrial Radio Access (E-UTRA); Requirements for support of radio resource management (Release 16), Mar. 2020, pp. 1-3641.

"3GPP TS 36.304 V16.0.0", 3rd Generation Partnership Project; Technical Specification Group Radio Access Network; Evolved Universal Terrestrial Radio Access (E-UTRA); User Equipment (UE) procedures in idle mode (Release 16), Mar. 2020, pp. 1-58.

"3GPP TS 38.331 V16.1.0", 3rd Generation Partnership Project; Technical Specification Group Radio Access Network; NR; Radio Resource Control (RRC) protocol specification (Release 16), Jul. 2020, pp. 1-906.

"3GPP TR 36.805 V9.0.0", 3rd Generation Partnership Project; Technical Specification Group Radio Access Network; Study on Minimization of drive-tests in Next Generation Networks; (Release 9), Dec. 2009, pp. 1-24.

"3GPP TS 37.320 V14.0.0", 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT), Mar. 2017, pp. 1-26.

* cited by examiner

```
-- ASN1START

UEInformationRequest-r9              ::=    SEQUENCE {
    rrc-TransactionIdentifier               RRC-TransactionIdentifier,
    criticalExtensions                      CHOICE {
        c1                                  CHOICE {
            ueInformationRequest-r9         UEInformationRequest-r9-IEs,
            spare3 NULL, spare2 NULL, spare1 NULL
        },
        criticalExtensionsFuture            SEQUENCE {}
    }
}

UEInformationRequest-r9-IEs          ::=    SEQUENCE {
    rach-ReportReq-r9                       BOOLEAN,
    rlf-ReportReq-r9                        BOOLEAN,
    nonCriticalExtension                    UEInformationRequest-v930-IEs       OPTIONAL
}

UEInformationRequest-v930-IEs        ::=    SEQUENCE {
    lateNonCriticalExtension                OCTET STRING                        OPTIONAL,
    nonCriticalExtension                    UEInformationRequest-v1020-IEs      OPTIONAL
}

UEInformationRequest-v1020-IEs       ::=    SEQUENCE {
    logMeasReportReq-r10                    ENUMERATED {true}                   OPTIONAL,  -- Need ON
    nonCriticalExtension                    UEInformationRequest-v1130-IEs      OPTIONAL
}

UEInformationRequest-v1130-IEs       ::=    SEQUENCE {
    connEstFailReportReq-r11                ENUMERATED {true}                   OPTIONAL,  -- Need ON
    nonCriticalExtension                    UEInformationRequest-v1250-IEs      OPTIONAL
}

UEInformationRequest-v1250-IEs       ::=    SEQUENCE {
    mobilityHistoryReportReq-r12            ENUMERATED {true}                   OPTIONAL,  -- Need ON
    nonCriticalExtension                    UEInformationRequest-v1530-IEs      OPTIONAL
}

UEInformationRequest-v1530-IEs       ::=    SEQUENCE {
    idleModeMeasurementReq-r15              ENUMERATED {true}                   OPTIONAL,  -- Need ON
    flightPathInfoReq-r15                   FlightPathInfoReportConfig-r15      OPTIONAL,  -- Need ON
    nonCriticalExtension                    SEQUENCE {}                         OPTIONAL
}

-- ASN1STOP
```

FIG. 5

```
-- ASN1START
UEInformationResponse-r9 ::=        SEQUENCE {
    rrc-TransactionIdentifier       RRC-TransactionIdentifier,
    criticalExtensions              CHOICE {
        c1                              CHOICE {
            ueInformationResponse-r9        UEInformationResponse-r9-IEs,
            spare3 NJLL, spare2 NULL, spare1 NULL
        },
        criticalExtensionsFuture        SEQUENCE {}
    }
}
UEInformationResponse-r9-IEs ::=    SEQUENCE {
    rach-Report-r9                  SEQUENCE {
        numberOfPreamblesSent-r9        NumberOfPreamblesSent-r11,
        contentionDetected-r9           BOOLEAN
    }                                                                   OPTIONAL,
    rlf-Report-r9                   RLF-Report-r9                       OPTIONAL,
    nonCriticalExtension            UEInformationResponse-v930-IEs      OPTIONAL
}
-- Late non critical extensions
UEInformationResponse-v9e0-IEs ::= SEQUENCE {
    rlf-Report-v9e0                     RLF-Report-v9e0                 OPTIONAL,
    nonCriticalExtension                SEQUENCE {}                     OPTIONAL
}
-- Regular non critical extensions
UEInformationResponse-v930-IEs ::=  SEQUENCE {
    lateNonCriticalExtension        OCTET STRING (CONTAINING
                                        UEInformationResponse-v9e0-IEs) OPTIONAL,
    nonCriticalExtension            UEInformationResponse-v1020-IEs OPTIONAL
}
UEInformationResponse-v1020-IEs ::= SEQUENCE {
    logMeasReport-r10                   LogMeasReport-r10               OPTIONAL,
    nonCriticalExtension                UEInformationResponse-v1130-IEs OPTIONAL
}
UEInformationResponse-v1130-IEs ::= SEQUENCE {
    connEstFailReport-r11               ConnEstFailReport-r11           OPTIONAL,
    nonCriticalExtension                UEInformationResponse-v1250-IEs OPTIONAL
}
UEInformationResponse-v1250-IEs ::= SEQUENCE {
    mobilityHistoryReport-r12           MobilityHistoryReport-r12       OPTIONAL,
    nonCriticalExtension                UEInformationResponse-v1530-IEs OPTIONAL
}
UEInformationResponse-v1530-IEs ::= SEQUENCE {
    measResultListIdle-r15              MeasResultListIdle-r15          OPTIONAL,
    flightPathInfoReport-r15            FlightPathInfoReport-r15        OPTIONAL,
    nonCriticalExtension                SEQUENCE {}                     OPTIONAL
}
```

FIG. 6A

```
RLF-Report-r9 ::=                   SEQUENCE {
    measResultLastServCell-r9       SEQUENCE {
        rsrpResult-r9                   RSRP-Range,
        rsrqResult-r9                   RSRQ-Range                      OPTIONAL
    },
    measResultNeighCells-r9         SEQUENCE {
        measResultListEUTRA-r9          MeasResultList2EUTRA-r9         OPTIONAL,
        measResultListUTRA-r9           MeasResultList2UTRA-r9          OPTIONAL,
        measResultListGERAN-r9          MeasResultListGERAN             OPTIONAL,
        measResultsCDMA2000-r9          MeasResultList2CDMA2000-r9      OPTIONAL
    } OPTIONAL,
    ...,
    [[ locationInfo-r10               LocationInfo-r10                OPTIONAL,
        failedPCellId-r10               CHOICE {
            cellGlobalId-r10                CellGlobalIdEUTRA,
            pci-arfcn-r10                   SEQUENCE {
                physCellId-r10                  PhysCellId,
                carrierFreq-r10                 ARFCN-ValueEUTRA
            }
        }                                                               OPTIONAL,
        reestablishmentCellId-r10       CellGlobalIdEUTRA               OPTIONAL,
        timeConnFailure-r10             INTEGER (0..1023)               OPTIONAL,
        connectionFailureType-r10       ENUMERATED {rlf, hof}           OPTIONAL,
        previousPCellId-r10             CellGlobalIdEUTRA               OPTIONAL
    ]],
    [[ failedPCellId-v1090            SEQUENCE {
            carrierFreq-v1090               ARFCN-ValueEUTRA-v9e0
        }                                                               OPTIONAL
    ]],
    [[ basicFields-r11                SEQUENCE {
            c-RNTI-r11                      C-RNTI,
            rlf-Cause-r11                   ENUMERATED {
                                                t310-Expiry, randomAccessProblem,
                                                rlc-MaxNumRetx, t312-Expiry-r12},
            timeSinceFailure-r11            TimeSinceFailure-r11
        }                                                               OPTIONAL,
        previousUTRA-CellId-r11         SEQUENCE {
            carrierFreq-r11                 ARFCN-ValueUTRA,
            physCellId-r11                  CHOICE {
                fdd-r11                         PhysCellIdUTRA-FDD,
                tdd-r11                         PhysCellIdUTRA-TDD
            },
            cellGlobalId-r11                CellGlobalIdUTRA                OPTIONAL
        }                                                               OPTIONAL,
        selectedUTRA-CellId-r11         SEQUENCE {
            carrierFreq-r11                 ARFCN-ValueUTRA,
            physCellId-r11                  CHOICE {
                fdd-r11                         PhysCellIdUTRA-FDD,
                tdd-r11                         PhysCellIdUTRA-TDD
            }
        }                                                               OPTIONAL
    ]],
    [[ failedPCellId-v1250            SEQUENCE {
            tac-FailedPCell-r12             TrackingAreaCode
        }                                                               OPTIONAL,
        measResultLastServCell-v1250    RSRQ-Range-v1250                OPTIONAL,
        lastServCellRSRQ-Type-r12       RSRQ-Type-r12                   OPTIONAL,
        measResultListEUTRA-v1250       MeasResultList2EUTRA-v1250      OPTIONAL
    ]],
    [[ drb-EstablishedWithQCI-1-r13   ENUMERATED {qci1}               OPTIONAL
    ]],
    [[ measResultLastServCell-v1360   RSRP-Range-v1360                OPTIONAL
    ]],
    [[ logMeasResultListBT-r15        LogMeasResultListBT-r15         OPTIONAL,
        logMeasResultListWLAN-r15       LogMeasResultListWLAN-r15       OPTIONAL
    ]]
}
```

FIG. 6B

```
ConnEstFailReport-r11 ::=        SEQUENCE {
    failedCellId-r11                 CellGlobalIdEUTRA,
    locationInfo-r11                 LocationInfo-r10                           OPTIONAL,
    measResultFailedCell-r11         SEQUENCE {
        rsrpResult-r11                   RSRP-Range,
        rsrqResult-r11                   RSRQ-Range                             OPTIONAL
    },
    measResultNeighCells-r11         SEQUENCE {
        measResultListEUTRA-r11          MeasResultList2EUTRA-r9                OPTIONAL,
        measResultList2UTRA-r11          MeasResultList2UTRA-r9                 OPTIONAL,
        measResultListGERAN-r11          MeasResultListGERAN                    OPTIONAL,
        measResultsCDMA2000-r11          MeasResultList2CDMA2000-r9             OPTIONAL
    }
    numberOfPreamblesSent-r11        NumberOfPreamblesSent-r11,
    contentionDetected-r11           BOOLEAN,
    maxTxPowerReached-r11            BOOLEAN,
    timeSinceFailure-r11             TimeSinceFailure-r11,
    measResultListEUTRA-v1130        MeasResultList2EUTRA-v9e0                  OPTIONAL,
    ...,
    [[  measResultFailedCell-v1250       RSRQ-Range-v1250                       OPTIONAL,
        failedCellRSRQ-Type-r12          RSRQ-Type-r12                          OPTIONAL,
        measResultListEUTRA-v1250        MeasResultList2EUTRA-v1250             OPTIONAL ]],
    [[  measResultFailedCell-v1360       RSRP-Range-v1360                       OPTIONAL ]],
    [[  logMeasResultListBT-r15          LogMeasResultListBT-r15                OPTIONAL,
        logMeasResultListWLAN-r15        LogMeasResultListWLAN-r15              OPTIONAL ]]
}
-- ASN1STOP
```

```
-- ASN1START
LoggedMeasurementConfiguration-r10 ::=   SEQUENCE {
    criticalExtensions                        CHOICE {
        c1                                        CHOICE {
            loggedMeasurementConfiguration-r10        LoggedMeasurementConfiguration-r10-IEs,
            spare3 NULL, spare2 NULL, spare1 NULL
        },
        criticalExtensionsFuture                  SEQUENCE {}
    }
}

LoggedMeasurementConfiguration-r10-IEs ::= SEQUENCE {
    traceReference-r10                        TraceReference-r10,
    traceRecordingSessionRef-r10              OCTET STRING (SIZE (2)),
    tce-Id-r10                                OCTET STRING (SIZE (1)),
    absoluteTimeInfo-r10,                     AbsoluteTimeInfo-r10,
    areaConfiguration-r10                     AreaConfiguration-r10                       OPTIONAL,    -- Need OR
    loggingDuration-r10                       LoggingDuration-r10,
    loggingInterval-r10                       LoggingInterval-r10,
    nonCriticalExtension                      LoggedMeasurementConfiguration-v1080-IEs    OPTIONAL
}

LoggedMeasurementConfiguration-v1080-IEs ::= SEQUENCE {
    lateNonCriticalExtension-r10              OCTET STRING                                                OPTIONAL,
    nonCriticalExtension                      LoggedMeasurementConfiguration-v1130-IEs                    OPTIONAL
}

LoggedMeasurementConfiguration-v1130-IEs ::= SEQUENCE {
    plmn-IdentityList-r11                     PLMN-IdentityList3-r11                      OPTIONAL,    -- Need OR
    areaConfiguration-v1130                   AreaConfiguration-v1130                     OPTIONAL,    -- Need OR
    nonCriticalExtension                      LoggedMeasurementConfiguration-v1250-IEs    OPTIONAL
}

LoggedMeasurementConfiguration-v1250-IEs ::= SEQUENCE {
    targetMBSFN-AreaList-r12                  TargetMBSFN-AreaList-r12                    OPTIONAL,    -- Need OP
    nonCriticalExtension                      LoggedMeasurementConfiguration-v1530-IEs    OPTIONAL
}

LoggedMeasurementConfiguration-v1530-IEs ::= SEQUENCE {
    bt-NameList-r15                           BT-NameList-r15                             OPTIONAL,    -- Need OR
    wlan-NameList-r15                         WLAN-NameList-r15                           OPTIONAL,    -- Need OR
    nonCriticalExtension                      SEQUENCE {}                                 OPTIONAL
}

TargetMBSFN-AreaList-r12 ::=              SEQUENCE (SIZE (0..maxMBSFN-Area)) OF TargetMBSFN-Area-r12
TargetMBSFN-Area-r12 ::=                  SEQUENCE {
    mbsfn-AreaId-r12                              MBSFN-AreaId-r12   OPTIONAL,    -- Need OR
    carrierFreq-r12                               ARFCN-ValueEUTRA-r9,
    ...
}

-- ASN1STOP
```

```
-- ASN1START
AreaConfiguration-r10 ::=        CHOICE {
    cellGlobalIdList-r10             CellGlobalIdList-r10,
    trackingAreaCodeList-r10         TrackingAreaCodeList-r10
}

AreaConfiguration-v1130 ::=      SEQUENCE {
    trackingAreaCodeList-v1130       TrackingAreaCodeList-v1130
}

CellGlobalIdList-r10 ::=         SEQUENCE (SIZE (1..32)) OF CellGlobalIdEUTRA
TrackingAreaCodeList-r10 ::=     SEQUENCE (SIZE (1..8)) OF TrackingAreaCode
TrackingAreaCodeList-v1130 ::=   SEQUENCE {
    plmn-Identity-perTAC-List-r11    SEQUENCE (SIZE (1..8)) OF PLMN-Identity
}
-- ASN1STOP
```

FIG. 8B

```
-- ASN1START
TraceReference-r10 ::=   SEQUENCE {
    plmn-Identity-r10        PLMN-Identity,
    traceId-r10              OCTET STRING (SIZE (3))
}
-- ASN1STOP
```

FIG. 8C

```
-- ASN1START
VarLogMeasConfig-r10 ::=       SEQUENCE {
    areaConfiguration-r10          AreaConfiguration-r10           OPTIONAL,
    loggingDuration-r10            LoggingDuration-r10,
    loggingInterval-r10            LoggingInterval-r10
}
VarLogMeasConfig-r11 ::=       SEQUENCE {
    areaConfiguration-r10          AreaConfiguration-r10           OPTIONAL,
    areaConfiguration-v1130        AreaConfiguration-v1130         OPTIONAL,
    loggingDuration-r10            LoggingDuration-r10,
    loggingInterval-r10            LoggingInterval-r10
}
VarLogMeasConfig-r12 ::=       SEQUENCE {
    areaConfiguration-r10          AreaConfiguration-r10           OPTIONAL,
    areaConfiguration-v1130        AreaConfiguration-v1130         OPTIONAL,
    loggingDuration-r10            LoggingDuration-r10,
    loggingInterval-r10            LoggingInterval-r10,
    targetMBSFN-AreaList-r12       TargetMBSFN-AreaList-r12        OPTIONAL
}
VarLogMeasConfig-r15 ::=       SEQUENCE {
    areaConfiguration-r10          AreaConfiguration-r10           OPTIONAL,
    areaConfiguration-v1130          AreaConfiguration-v1130       OPTIONAL,
    loggingDuration-r10              LoggingDuration-r10,
    loggingInterval-r10              LoggingInterval-r10,
    targetMBSFN-AreaList-r12         TargetMBSFN-AreaList-r12      OPTIONAL,
    bt-NameList-r15                BT-NameList-r15                 OPTIONAL,
    wlan-NameList-r15              WLAN-NameList-r15               OPTIONAL
}
-- ASN1STOP
```

FIG. 9

```
-- ASN1START
VarLogMeasReport-r10 ::=     SEQUENCE {
    traceReference-r10           TraceReference-r10,
    traceRecordingSessionRef-r10 OCTET STRING (SIZE (2)),
    tce-Id-r10                   OCTET STRING (SIZE (1)),
    plmn-Identity-r10            PLMN-Identity,
    absoluteTimeInfo-r10         AbsoluteTimeInfo-r10,
    logMeasInfoList-r10          LogMeasInfoList2-r10
}
...
LogMeasInfoList2-r10 ::=  SEQUENCE (SIZE (1..maxLogMeas-r10)) OF LogMeasInfo-r10
LogMeasInfo-r10 ::=       SEQUENCE {
    locationInfo-r10        LocationInfo-r10      OPTIONAL,
    relativeTimeStamp-r10   INTEGER (0..7200),
    servCellIdentity-r10    CellGlobalIdEUTRA,
    measResultServCell-r1   SEQUENCE {
        rsrpResult-r10          RSRP-Range,
        rsrqResult-r10          RSRQ-Range
    },
    measResultNeighCells-r10    SEQUENCE {
        measResultListEUTRA-r10      MeasResultList2EUTRA-r9        OPTIONAL,
        measResultListUTRA-r10       MeasResultList2UTRA-r9         OPTIONAL,
        measResultListGERAN-r10      MeasResultList2GERAN-r10       OPTIONAL,
        measResultListCDMA2000-r10   MeasResultList2CDMA2000-r9     OPTIONAL
    } OPTIONAL,
    ...,
    [[ measResultListEUTRA-v1090    MeasResultList2EUTRA-v9e0      OPTIONAL ]],
    [[ measResultListMBSFN-r12      MeasResultListMBSFN-r12        OPTIONAL,
       measResultServCell-v1250     RSRQ-Range-v1250               OPTIONAL,
       servCellRSRQ-Type-r12        RSRQ-Type-r12                  OPTIONAL,
       measResultListEUTRA-v1250    MeasResultList2EUTRA-v1250     OPTIONAL ]],
    [[ inDeviceCoexDetected-r13    ENUMERATED {true}               OPTIONAL ]],
    [[ measResultServCell-v1360    RSRP-Range-v1360                OPTIONAL ]],
    [[ logMeasResultListBT-r15     LogMeasResultListBT-r15         OPTIONAL,
       logMeasResultListWLAN-r15   LogMeasResultListWLAN-r15       OPTIONAL ]],
}
MeasResultList2EUTRA-r9 ::=   SEQUENCE (SIZE (1..maxFreq)) OF MeasResult2EUTRA-r9
MeasResult2EUTRA-r9 ::=       SEQUENCE {
    carrierFreq-r9            ARFCN-ValueEUTRA,
    measResultList-r9         MeasResultListEUTRA
}
MeasResultListEUTRA ::=   SEQUENCE (SIZE (1..maxCellReport)) OF MeasResultEUTRA
MeasResultEUTRA ::=       SEQUENCE {
    physCellId                PhysCellId,
    cgi-Info                  SEQUENCE {
        cellGlobalId              CellGlobalIdEUTRA,
        trackingAreaCode          TrackingAreaCode,
        plmn-IdentityList         PLMN-IdentityList2             OPTIONAL
    }                                                            OPTIONAL,
    measResult                SEQUENCE {
        rsrpResult                RSRP-Range                     OPTIONAL,
        rsrqResult                RSRQ-Range                     OPTIONAL,
        ...,
        [[ additionalSI-Info-r9    AdditionalSI-Info-r9          OPTIONAL ]],
        [[ primaryPLMN-Suitable-r12 ENUMERATED {true}            OPTIONAL,
           measResult-v1250         RSRQ-Range-v1250             OPTIONAL ]],
        [[ rs-sinr-Result-r13       RS-SINR-Range-r13            OPTIONAL,
           cgi-Info-v1310           SEQUENCE {
               freqBandIndicator-r13        FreqBandIndicator-r11  OPTIONAL,
               multiBandInfoList-r13        MultiBandInfoList-r11  OPTIONAL,
               freqBandIndicatorPriority-r13 ENUMERATED {true}     OPTIONAL
           }                                                       OPTIONAL
        ]],
        [[ measResult-v1360         RSRP-Range-v1360             OPTIONAL ]],
        [[ cgi-Info-5GC-r15         SEQUENCE (SIZE (1..maxPLMN-r11)) OF
                                    CellAccessRelatedInfo-5GC-r15 OPTIONAL ]]
    }
}
-- ASN1STOP
```

FIG. 10

```
-- TAG-LOGGEDMEASUREMENTCONFIGURATION-START
LoggedMeasurementConfiguration-r16 ::=   SEQUENCE {
    criticalExtensions                       CHOICE {
        loggedMeasurementConfiguration-r16       LoggedMeasurementConfiguration-r16-IEs,
        criticalExtensionsFuture                 SEQUENCE {}
    }
}

LoggedMeasurementConfiguration-r16-IEs ::= SEQUENCE {
    traceReference-r16                       TraceReference-r16,
    traceRecordingSessionRef-r16             OCTET STRING (SIZE (2)),
    tce-Id-r16                               OCTET STRING (SIZE (1)),
    absoluteTimeInfo-r16                     AbsoluteTimeInfo-r16,
    areaConfiguration-r16                    AreaConfiguration-r16                        OPTIONAL,   --Need R
    plmn-IdentityList2-r16                   PLMN-IdentityList2-r16                       OPTIONAL,   --Need R
    bt-NameList-r16                          SetupRelease {BT-NameList-r16}               OPTIONAL,   --Need M
    wlan-NameList-r16                        SetupRelease {WLAN-NameList-r16}             OPTIONAL,   --Need M
    sensor-NameList-r16                      SetupRelease {Sensor-NameList-r16}           OPTIONAL,   --Need M
    loggingDuration-r16                      LoggingDuration-r16,
    reportType                               CHOICE {
        periodical                               LoggedPeriodicalReportConfig-r16,
        eventTriggered                           LoggedEventTriggerConfig-r16,
    },
    wlanStatusReport                         BOOLEAN                                      OPTIONAL,
    btStatusReport                           BOOLEAN                                      OPTIONAL,
    gnssStatusReport                         BOOLEAN                                      OPTIONAL,
    lateNonCriticalExtension                 OCTET STRING                                 OPTIONAL,
    nonCriticalExtension                     SEQUENCE {}                                  OPTIONAL
}

LoggedPeriodicalReportConfig-r16 ::=     SEQUENCE {
    loggingInterval-r16                      LoggingInterval-r16,
    ...
}

LoggedEventTriggerConfig-r16 ::=         SEQUENCE {
    eventType-r16                            EventType-r16,
    loggingInterval-r16                      LoggingInterval-r16,
    ...
}

EventType-r16 ::=  CHOICE {
    outOfCoverage         NULL,
    eventL1               SEQUENCE {
        l1-Threshold           MeasTriggerQuantity,
        hysteresis             Hysteresis,
        timeToTrigger          TimeToTrigger
    },
    ...
}

-- TAG-LOGGEDMEASUREMENTCONFIGURATION-STOP
-- ASN1STOP
```

FIG. 11

```
-- ASN1START
-- TAG-COMMONLOCATIONINFO-START
CommonLocationInfo-r16 ::=      SEQUENCE {
    gnss-TOD-msec-r16               OCTET STRING            OPTIONAL,
    locationTimestamp-r16           OCTET STRING            OPTIONAL,
    locationCoordinate-r16          OCTET STRING            OPTIONAL,
    locationError-r16               OCTET STRING            OPTIONAL,
    locationSource-r16              OCTET STRING            OPTIONAL,
    velocityEstimate-r16            OCTET STRING            OPTIONAL,
    gnssStatus                      ENUMERATED {ON, OFF}    OPTIONAL,
    outOfGNSSCoverage               ENUMERATED {TRUE, FALSE} OPTIONAL
    ...
}
-- TAG-COMMONLOCATIONINFO-STOP
-- ASN1STOP
```

FIG. 12

```
-- TAG-LOGMEASRESULTLISTBT-START
LogMeasResultListBT-r16 ::= SEQUENCE (SIZE (1..maxBT-IdReport-r16)) OF
                                        LogMeasResultBT-r16
LogMeasResultBT-r16   ::= SEQUENCE {
    bt-Addr-r16             BIT STRING (SIZE (48))      OPTIONAL,
    rssi-BT-r16             INTEGER (-128..127)         OPTIONAL,
    ...,
    btStatus                ENUMERATED {ON, OFF}        OPTIONAL,
    outOfBTCoverage         ENUMERATED {TRUE, FALSE}    OPTIONAL
}
-- TAG-LOGMEASRESULTLISTBT-STOP
-- ASN1STOP
```

FIG. 13

```
-- ASN1START
-- TAG-LOGMEASRESULTLISTWLAN-START
LogMeasResultListWLAN-r16 ::= SEQUENC (SIZE(1..maxWLAN-Id-Report-r16)) OF
                                        LogMeasResultWLAN-r16
LogMeasResultWLAN-r16 ::= SEQUENCE {
    wlan-Identifiers-r16    WLAN-Identifiers-r16        OPTIONAL,
    rssiWLAN-r16            WLAN-RSSI-Range-r16         OPTIONAL,
    rtt-WLAN-r16            WLAN-RTT-r16                OPTIONAL,
    ...,
    wlanStatus              ENUMERATED {ON, OFF}        OPTIONAL,
    outOfWLANCoverage       ENUMERATED {TRUE, FALSE}    OPTIONAL }
WLAN-Identifiers-r16 ::= SEQUENCE {
    ssid-r16                OCTET STRING (SIZE (1..32)) OPTIONAL,
    bssid-r16               OCTET STRING (SIZE (6))     OPTIONAL,
    hessid-r16              OCTET STRING (SIZE (6))     OPTIONAL,
    ...
}
WLAN-RSSI-Range-r16 ::= INTEGER(0..141)
WLAN-RTT-r16 ::=            SEQUENCE {
    rttValue-r16                INTEGER (0..16777215),
    rttUnits-r16                ENUMERATED { microseconds, hundredsofnanoseconds,
                                    tensofnanoseconds, nanoseconds,
                                    tenthsofnanoseconds, ... },
    rttAccuracy-r16             INTEGER (0..255)            OPTIONAL,
    ...
}
-- ASN1STOP
-- TAG-LOGMEASRESULTLISTWLAN-STOP
```

FIG. 14

USER EQUIPMENT (UE) REPORTING OF NON-CELLULAR RECEIVER STATUS

TECHNICAL FIELD

The present disclosure generally relates to wireless communication networks, and more specifically to user equipment (UE) that can receive various non-cellular signals (e.g., Bluetooth, wireless LAN) in addition to communicating with a cellular radio access network (RAN).

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

Currently the fifth generation ("5G") of cellular systems, also referred to as New Radio (NR), is being standardized within the Third-Generation Partnership Project (3GPP). NR is developed for maximum flexibility to support multiple and substantially different use cases but shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. In addition to RRC_IDLE and RRC_CONNECTED, the NR RRC layer also includes an RRC_INACTIVE state with properties similar to a "suspended" condition in LTE Rel-13.

In addition to providing coverage via cells, as in LTE, NR networks also provide coverage via "beams." In general, a DL "beam" is a coverage area of a network-transmitted reference signal (RS) that may be measured or monitored by a UE. In NR, for example, such RS can include any of the following, alone or in combination: SS/PBCH block (SSB), CSI-RS, tertiary reference signals (or any other sync signal), positioning RS (PRS), demodulation RS (DMRS), phase-tracking RS (PTRS), etc. In general, SSB is available to all UEs regardless of RRC state, while other RS (e.g., CSI-RS, DMRS, PTRS) are associated with specific UEs that are in RRC_CONNECTED state.

Seamless mobility is a key feature of 3GPP radio access technologies (RATs). In general, a network configures a UE to perform and report radio resource management (RRM) measurements to assist network-controlled mobility decisions, such as for handover from a serving cell to a neighbor cell. Seamless handovers ensure that the UE moves around in the coverage area of different cells without causing too many interruptions in data transmission. However, there will be scenarios when the network fails to handover the UE to the "correct" neighbor cell in time, which can cause the UE will declare radio link failure (RLF) or handover failure (HOF). Similarly, the UE may experience failure when trying to reestablish a failed connection with the network, causing the UE to declare connection establishment failure (CEF).

Various UE failure reporting procedures were introduced as part of the mobility robustness optimization (MRO) in LTE Rel-9. In these procedures, UEs log relevant information at the time of failure (e.g., RLF) and later report such information to the network via target cells to which UEs ultimately connect (e.g., after reestablishment). The reported information can include RRM measurements of various neighbor cells prior to the mobility operation (e.g., handover).

In addition, UEs can be configured to perform and report measurements to support minimization of drive tests (MDT), which is intended to reduce and/or minimize the requirements for manual testing of actual network performance (i.e., by driving around the coverage area of the network). The MDT feature was first studied in LTE Rel-9 (e.g., 3GPP TR 36.805 v9.0.0) and first standardized in Rel-10. MDT supports various network performance improvements such as coverage optimization, capacity optimization, mobility optimization, quality-of-service (QOS) verification, and parameterization for common channels (e.g., PDSCH).

In general, a UE can be configured by the network to perform logged MDT and/or immediate MDT measurements. More specifically, a UE in RRC_IDLE or RRC_INACTIVE state can be configured to periodically perform and log MDT-related measurements, and report these to the network upon return to RRC_CONNECTED state. Likewise, a UE can be configured to perform and report immediate MDT measurements while in RRC_CONNECTED state.

In addition to measurements of various cells in the network, a cellular (e.g., LTE) network can configure a served UE to perform, log, and/or report measurements of various non-cellular signals, including those transmitted by wireless LAN (WLAN) access points (APs), Bluetooth (BT) beacons, and global navigation satellite system (GNSS) satellites.

SUMMARY

There can be various reasons why a UE does not actually perform and/or report configured non-cellular measurements, which can create various problems, issues, and/or difficulties for the cellular network receiving such UE reports. Embodiments of the present disclosure provide specific improvements to reporting of non-cellular measurements by UEs in a cellular radio access network (RAN), such as by facilitating solutions to these problems, issues, and/or difficulties.

Embodiments include methods (e.g., procedures) for a UE operating in a cellular radio access network (RAN). These exemplary methods can be performed by a UE (e.g., wireless device, MTC device, NB-IoT device, modem, etc. or component thereof).

These exemplary methods can include receiving, from the cellular RAN, a measurement reporting configuration including identification of non-cellular signals, of one or more types, for which measurements are requested from the UE. These exemplary methods can also include measuring at least the identified non-cellular signals (e.g., but also possibly other non-identified signals, such as GNSS). These exemplary methods can also include transmitting, to the cellular RAN, a measurement report including one or more of the following for each particular type of identified non-cellular signal:

a first indication of whether the UE's corresponding non-cellular receiver was enabled during a measurement duration, and a second indication of whether the UE was out-of-coverage during the measurement duration in relation to all identified non-cellular signals of the particular type.

In some embodiments, the identification of the non-cellular signals includes a first list of wireless LAN (WLAN) access point identifiers and a second list of Bluetooth (BT) beacon identifiers.

In some embodiments, the measurement reporting configuration can also include one or more of the following: the measurement duration; and a request that the UE should report status of one or more non-cellular receivers that correspond to the one or more types of identified non-cellular signals.

In some embodiments, the measuring operations can include selectively measuring the identified non-cellular signals of each particular type based on whether the UE's corresponding non-cellular receiver is enabled during the measurement duration, and whether the identified non-cellular signals can be received by the corresponding non-cellular receiver during the measurement duration.

In some embodiments, for each particular type of non-cellular signal, when the UE's corresponding non-cellular receiver was enabled during the measurement duration, one or more of the following applies:

the second indication is included in the measurement report and the first indication is not included in the measurement report; and the second indication comprises a variable having a first value indicating the UE was out-of-coverage in relation to all identified non-cellular signals of the particular type.

In some of these embodiments, for each particular type of identified non-cellular signal, when the UE's corresponding non-cellular receiver was enabled during the measurement duration, the second indication further comprises one of the following indicating the UE was in-coverage in relation to at least one identified non-cellular signal of the particular type: a second value of the variable; or measurements of the at least one identified non-cellular signal.

In some embodiments, the measuring operations can include selectively measuring global navigation satellite system (GNSS) signals based on whether the UE's GNSS receiver is enabled during the measurement duration, and whether GNSS signals can be received by the UE's GNSS receiver during the measurement duration. In such embodiments, the measurement report can include one or more of the following:
  a third indication of whether the UE's GNSS receiver was enabled during the measurement duration, and
  a fourth indication of whether the UE was out-of-coverage during the measurement duration in relation to GNSS signals.

In some embodiments, the identified non-cellular signals can at least partially overlap in coverage with one or more cells of the RAN. In such case, the measurement report can also include measurements for the one or more cells of the RAN.

In some embodiments, the measurement reporting configuration can be received and/or the measuring operations can be performed while the UE's connection to the cellular RAN is in an active state. In some of embodiments, these exemplary methods can also include changing the connection to the cellular RAN to a non-active state, after which the measurement report can be transmitted.

In some embodiments, measuring at least the identified non-cellular signals can be performed during one of the following:
  a plurality of logging intervals while the UE's connection to the cellular RAN is in the non-active state;
  a period immediately before declaring a connection establishment failure, CEF, while attempting to change the UE's connection to the cellular RAN back to the active state;
  a period immediately before declaring a radio link failure, RLF.

Other embodiments include methods (e.g., procedures) for a network node configured to operate in a cellular RAN. These exemplary methods can be performed by a network node (e.g., base station, eNB, gNB, ng-eNB, en-gNB, etc. or component thereof).

These exemplary methods can include transmitting, to a UE, a measurement reporting configuration including identification of non-cellular signals, of one or more types, for which measurements are requested from the UE. These exemplary methods can also include receiving, from the UE, a measurement report including one or more of the following for each particular type of identified non-cellular signal:
  a first indication of whether the UE's corresponding non-cellular receiver was enabled during a measurement duration, and
  a second indication of whether the UE was out-of-coverage during the measurement duration in relation to all identified non-cellular signals of the particular type.

In some embodiments, the identification of the non-cellular signals includes a first list of WLAN access point identifiers and a second list of BT beacon identifiers.

In some embodiments, the measurement reporting configuration can also include one or more of the following: the measurement duration; and a request that the UE should report status of one or more non-cellular receivers that correspond to the one or more types of identified non-cellular signals.

In some embodiments, for each particular type of identified non-cellular signal, when the UE's corresponding non-cellular receiver was enabled during the measurement duration, one or more of the following applies:
  the second indication is included in the measurement report and the first indication is not included in the measurement report; and
  the second indication comprises a variable having a first value indicating the UE was out-of-coverage in relation to all identified non-cellular signals of the particular type.

In some of these embodiments, for each particular type of identified non-cellular signal, when the UE's corresponding non-cellular receiver was enabled during the measurement duration, the second indication further comprises one of the following indicating the UE was in-coverage in relation to at least one identified non-cellular signal of the particular type: a second value of the variable; or measurements of the at least one identified non-cellular signal.

In some embodiments, the measurement report can also include one or more of the following:
  a third indication of whether the UE's GNSS receiver was enabled during the measurement duration, and
  a fourth indication of whether the UE was out-of-coverage during the measurement duration in relation to GNSS signals.

In some embodiments, the identified non-cellular signals can at least partially overlap in coverage with one or more cells of the RAN. In such case, the measurement report can also include measurements for the one or more cells of the RAN.

In some embodiments, the measurement reporting configuration can be transmitted and/or the measurement duration can occur while the UE's connection to the cellular RAN is in an active state. In some embodiments, these exemplary methods can also include changing the UE's connection to the cellular RAN to a non-active state. The measurement report can be received after changing the UE's connection to the cellular RAN from the non-active state back to the active state.

In some embodiments, the measurement duration comprises one of the following:
  a plurality of logging intervals while the UE's connection to the cellular RAN is in the non-active state;
  a period immediately before the UE declares a connection establishment failure (CEF) while attempting to change the UE's connection to the cellular RAN back to the active state;
  a period immediately before the UE declares a radio link failure (RLF).

In some embodiments, when the measurement report indicates that at least one UE non-cellular receiver, corresponding to at least one type of identified non-cellular signals, was not enabled during the measurement duration, these exemplary methods can also include discarding at least a portion of any of the following that are included in the measurement report: measurements of one or more cells of the RAN; and measurements of other types of identified non-cellular signals. In some of these embodiments, the discarding is performed for all included measurement. In other of these embodiments, the discarding is performed only for included measurements in the same coverage area as the at least one type of identified non-cellular signals.

In other embodiments, when the measurement report indicates that at least one UE non-cellular receiver was not enabled during the measurement duration, these exemplary methods can also include combining the measurements included in the measurement report with measurements included in one or more further measurement reports indicating that the same at least one non-cellular receiver was enabled during respective further measurement durations. In some of these embodiments, the identification of the non-cellular signals includes a first list of WLAN access point identifiers and a second list of BT beacon identifiers, and the measurement report indicates that the UE's BT receiver was enabled and that the UE's WLAN receiver was not enabled during the measurement duration.

In other embodiments, these exemplary methods can also include estimating one or more of the following based on the measurement report indicating that that at least one UE non-cellular receiver was enabled but that the UE was out-of-coverage during the measurement duration in relation to all identified non-cellular signals of the corresponding at least one type: coverage of one or more cells in the RAN; and a location of the UE.

Other embodiments include UEs (e.g., wireless devices, MTC devices, NB-IoT devices, or components thereof, such as a modem) and network nodes (e.g., base stations, eNBs, gNBs, ng-eNBs, en-gNBs, etc. or components thereof) configured to perform operations corresponding to any of the exemplary methods described herein. Other embodiments include non-transitory, computer-readable media storing program instructions that, when executed by processing circuitry, configure such UEs and network nodes to perform operations corresponding to the exemplary methods described herein.

These and other embodiments described herein can facilitate UE reporting of additional status information of one or more non-cellular receivers that correspond to the one or more types of non-cellular signals that are identified by the network in a measurement reporting configuration. By receiving such information, the network can determine whether to use UE measurement reports that do not include certain non-cellular measurements configured/identified by the network. This can improve a network's ability to perform remedial actions for cells in which a reported failure occurs, which can reduce and/or eliminate subsequent failures in these cells. Embodiments can make MDT procedures more robust by providing additional measurement information. In this manner, embodiments can improve reliability of wireless networks.

These and other objects, features, benefits, and advantages of embodiments of the present disclosure will become apparent upon reading the following Detailed Description in view of the Drawings briefly described below.

BRIEF DESCRIPTION OF THE DRAWINGS

FIG. 5 shows an exemplary ASN.1 data structure for a UEInformationRequest message.

FIG. 6, which includes FIGS. 6A-C, shows an exemplary ASN.1 data structure for a UEInformationResponse message.

FIG. 8, which includes FIGS. 8A-C, shows various ASN.1 data structures for an exemplary LoggedMeasurementConfiguration message.

FIG. 9 shows an ASN.1 data structure for an exemplary VarLogMeasConfig variable and/or information element (IE).

FIG. 10 shows an ASN.1 data structure for an exemplary VarLogMeasReport variable and/or IE.

FIG. 11 shows an ASN.1 data structure for an exemplary LoggedMeasurement-Configuration message, according to various embodiments of the present disclosure.

FIG. 12 shows an ASN.1 data structure for an exemplary CommonLocationInfo IE, according to various embodiments of the present disclosure.

FIG. 13 shows an ASN.1 data structure for an exemplary LogMeasResultListBT IE, according to various embodiments of the present disclosure.

FIG. 14 shows an ASN.1 data structure for an exemplary LogMeasResultListWLAN IE, according to various embodiments of the present disclosure.

DETAILED DESCRIPTION

Figure 1:
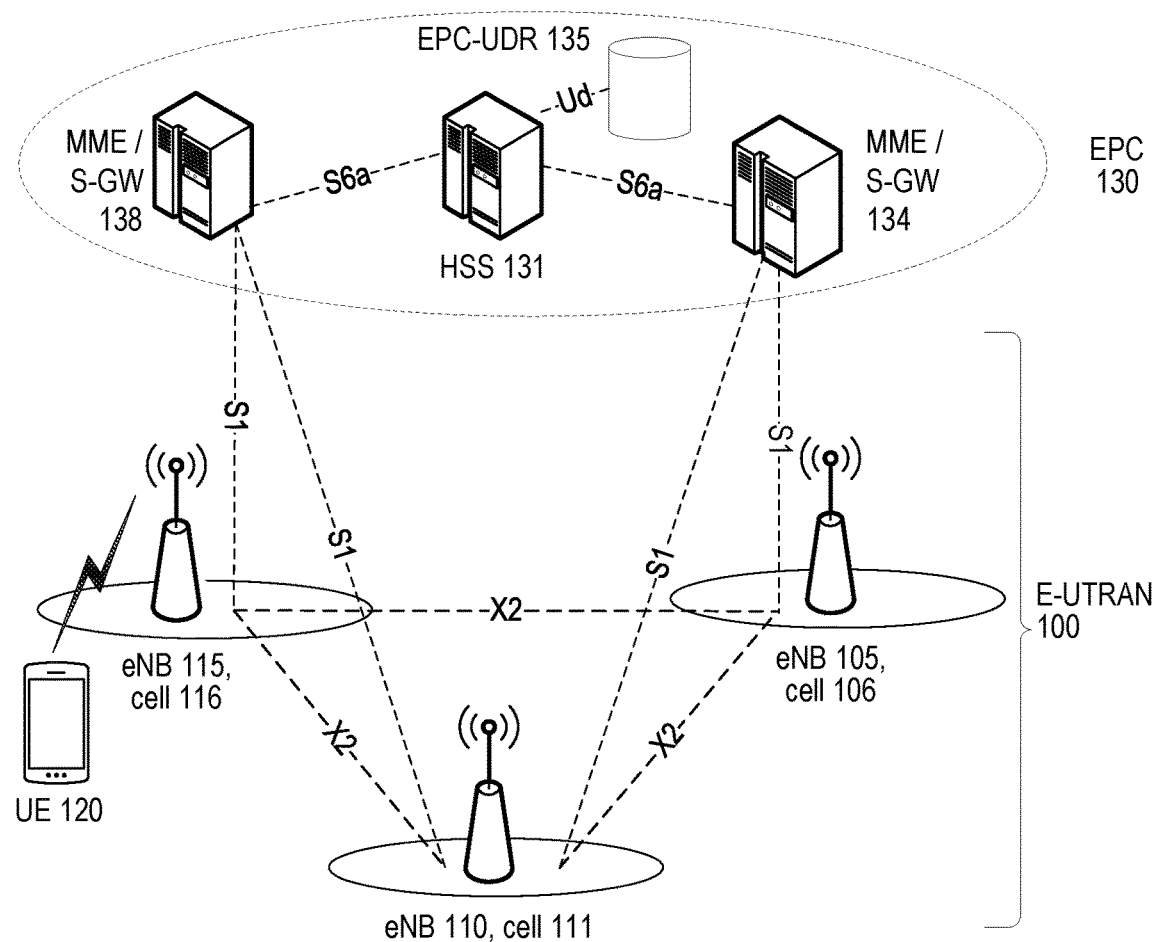
FIG. 1 is a high-level block diagram of an exemplary LTE network architecture.
Figure 2:
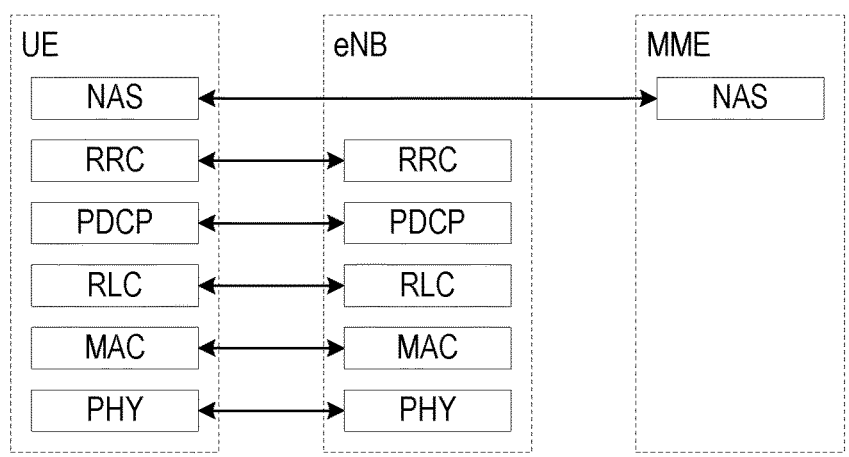
FIG. 2 shows exemplary LTE control plane (CP) protocol layers.

Embodiments summarized above will now be described in more detail with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (SMF), a location management function (LMF), a user plane function (UPF), a Network Exposure Function (NEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Cellular RAN: As used herein, a "cellular RAN" is a network comprising radio access nodes that provide network access (e.g., for voice and/or data communication) to wireless devices via radio signals transmitted in respective adjacent coverage areas ("cells"). These coverage areas are joined together by communication between the radio access nodes to provide continuous access for wireless devices over a larger network coverage area. Examples of cellular RANs include GERAN, UTRAN, E-UTRAN, NG-RAN, non-terrestrial RANs, etc.

Non-cellular signals: As used herein, "non-cellular signals" are radio-frequency signals that are transmitted by a system and/or network other than a cellular RAN, such as wireless LAN access points, Bluetooth beacons, GNSS satellites, etc.

Note that the description herein focuses on a 3GPP cellular communications system and, as such, 3GPP terminology or terminology similar to 3GPP terminology is often used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, the network can configure a UE to perform and report radio resource management (RRM) measurements to assist network-controlled mobility decisions, such as for handover, SCG change, etc. The reported information can include RRM measurements of various neighbor cells logged prior to the mobility operation (e.g., handover). In addition, the UE can be configured to report various measurements in relation to a failure event (e.g., RLF, CEF, HOF, etc.) and for minimization of drive testing. In any case, the UE can be configured to report measurements of various non-cellular signals, including those transmitted by WLAN access points, BT beacons, and GNSS satellites. However, there can be various reasons why a UE does not actually perform and/or report configured non-cellular measurements, which can create various problems, issues, and/or difficulties for the cellular network receiving such UE reports. This is discussed in more detail below.

In RRC_CONNECTED state, the network typically configures the UE to perform and report RRM measurements to assist network-controlled mobility decisions such as handover from one cell to another. A RLF procedure is typically triggered in the UE when something unexpected happens in any of the mobility-related procedures, including handover. The RLF procedure involves interactions between RRC and lower layer protocols such as PHY (or L1), MAC, RLC, etc. including radio link monitoring (RLM) on L1.

Upon handover failure (HOF) and RLF, the UE may take autonomous actions such as trying to select a cell and initiate reestablishment procedure so that the UE can remain reachable by the network. In general, a UE declares RLF only when the UE realizes that there is no reliable communication channel (or radio link) available between itself and the network, which can result in poor user experience. Also, reestablishing the connection requires signaling with a newly selected cell (e.g., random access procedure, exchanging various RRC messages, etc.), introducing latency until the UE can again reliably transmit and/or receive user data with the network. According to 3GPP TS 36.331 (v15.7.0), the possible causes for RLF include:

1) Expiry of the radio link monitoring (RLM) related timer T310;
2) Expiry of the measurement reporting associated timer T312 (not receiving the handover command from the network within this timer's duration despite sending the measurement report when T310 was running);
3) Upon reaching the maximum number of RLC retransmissions; and
4) Upon receiving random access problem indication from the MAC entity.

Since RLF leads to reestablishment in a new cell and degradation of UE/network performance and end-user experience, it is in the interest of the network to understand the reasons for UE RLF and to optimize mobility-related parameters (e.g., trigger conditions of measurement reports) to reduce, minimize, and/or avoid subsequent RLFs. Before Rel-9 mobility robustness optimizations (MRO), only the UE was aware of radio quality at the time of RLF, the actual reason for declaring RLF, etc. To identify the RLF cause, the network requires more information from the UE and from the neighboring base stations (e.g., eNBs).

The principle of RLM is similar in LTE and NR. In general, the UE monitors link quality of the UE's serving cell and uses that information to decide whether the UE is in-sync (IS) or out-of-sync (OOS) with respect to that serving cell. In LTE, RLM is carried out by the UE measuring downlink reference signals (e.g., CRS) in RRC_CONNECTED state. If RLM (i.e., by L1/PHY) indicates number of consecutive OOS conditions to the UE RRC layer, then RRC starts a radio link failure (RLF) procedure and declares RLF after expiry of a timer (e.g., T310). The L1 RLM procedure is carried out by comparing the estimated CRS measurements to some target block error rates (BLERs), called Qout and Qin. In particular, Qout and Qin correspond to BLER of hypothetical PDCCH/PCIFCH transmissions from the serving cell, with exemplary values of 10% and 2%, respectively. In NR, the network can define the RS type (e.g., CSI-RS and/or SSB), exact resources to be monitored, and even the BLER target for IS and OOS indications.

Figure 3:
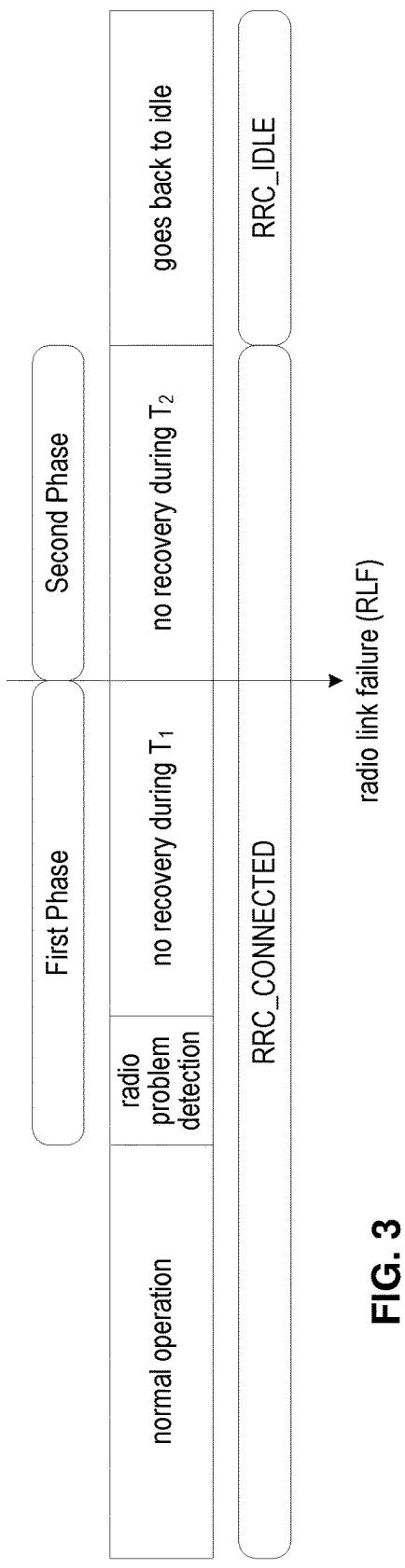
FIG. 3 shows a high-level timing diagram illustrating two phases of an exemplary radio link failure (RLF) procedure in LTE and NR.

FIG. 3 shows a high-level timing diagram illustrating the two phases of a RLF procedure in LTE and NR. The first phase starts when the UE detects a radio problem during normal operation in RRC_CONNECTED state and results in the UE declaring RLF if no recovery is made during a period T1. The second phase starts upon RLF declaration and ends with the UE returning to RRC_IDLE state if no recovery is made during a period T2.

Figure 4:
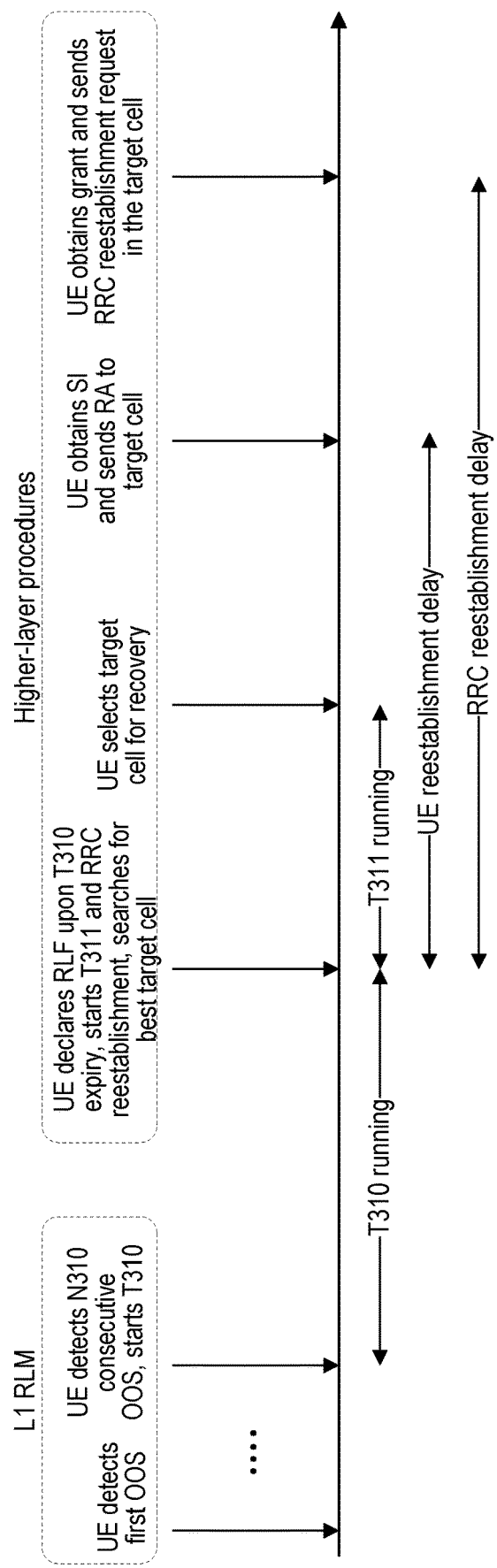
FIG. 4 shows a more detailed version of a UE's operations during an exemplary LTE RLF procedure.

FIG. 4 shows a more detailed version of UE operations during an exemplary LTE RLF procedure. In this example, the UE detects N310 (i.e., a counter value) consecutive OOS conditions during L1 RLM procedures, as discussed above, and then initiates timer T310. Subsequent operations are performed by higher layers (e.g., RRC). After expiry of T310, the UE starts T311 and RRC reestablishment, searching for the best target cell. After selecting a target cell for reestablishment, the UE obtains S1 for the target cell and performs a random access (e.g., via RACH). The duration after T310 expiry until this point can be considered the UE's reestablishment delay. Ultimately, the UE obtains access to the target cell and sends an RRC Reestablishment Request message to the target cell. The duration after T310 expiry until this point can be considered the total RRC reestablishment delay.

The reason for introducing these timers and corresponding counters is to add filtering, delay, and/or hysteresis to a UE's determination of failure and/or recovery of a radio link with a serving cell. These parameters avoid a UE abandoning a connection prematurely due to a brief or temporary reduction in link quality that could be recovered by the UE (e.g., before T310 expires, before the counter value N310, etc.). In general, this improves user experience.

In addition to physical layer issues described above, a UE can declare RLF based on any of the following events:
  random access problem indication from MAC layer;
  indication from RLC layer that a maximum number of retransmissions has been reached;
  receiving a backhaul RLF from a parent node when connected as an Integrated Access Backhaul (IAB) node; and
  consistent UL listen-before-talk (LBT) failure indication from MAC layer when operating in unlicensed spectrum.

A UE stores a RLF report in a variable called varRLF-Report and retains it in memory for up to 48 hours, after which it may discard the information. When sending certain RRC messages such as RRCReconfigurationComplete, RRCReestablishmentComplete, RRCSetupComplete, and RRCResumeComplete, the UE can indicate it has a stored RLF report by setting a rlf-InfoAvailable field to "true". The network can request the UE to provide the RLF report by sending a UEInformationRequest message with the rlf-ReportReq field set to "true". The UE will respond with a UEInformationResponse message that includes the indicated/requested RLF report.

FIG. 5 shows an ASN. 1 data structure that defines an exemplary UEInformationRequest message. Note that the rlf-ReportReq-r9 field in the UEInformationRequest-r9-IEs is a Boolean variable that indicates whether or not the network is requesting the report from the UE. In addition, FIG. 6, which includes FIGS. 6A-C, shows an ASN.1 data structure that defines an exemplary UEInformationResponse message sent by the UE in response to a UEInformationRequest message. In particular, the IE RLF-Report-r9 (FIG. 6B) can be sent in response to the network requesting an RLF report via rlf-ReportReq-r9.

The above discussion assumes that the UE is operating in single connectivity with a network node. LTE dual connectivity (DC) was introduced in Rel-12. In DC operation, a UE in RRC_CONNECTED state consumes radio resources provided by at least two different network points connected to one another with a non-ideal backhaul. In LTE, these two network points may be referred to as a "Master eNB" (MeNB) and a "Secondary eNB" (SeNB). More generally, the terms master node (MN), anchor node, and MeNB can be used interchangeably, while the terms secondary node (SN), booster node, and SeNB can also be used interchangeably. DC can be viewed as a special case of carrier aggregation (CA), in which the aggregated carriers (or cells) are provided by network nodes that are physically separated and not connected via a robust, high-capacity connection.

DC is also envisioned as an important feature for 5G/NR networks. Several DC (or more generally, multi-connectivity) scenarios have been considered for NR. These include NR-DC that is similar to LTE-DC discussed above, except that both the MN and SN (referred to as "gNBs") employ the NR interface to communicate with the UE. In addition, various multi-RAT DC (MR-DC) scenarios have been considered, whereby a UE can be configured to uses resources provided by two different nodes, one providing E-UTRA/LTE access and the other one providing NR access. One node acts as the MN (e.g., providing MCG) and the other as the SN (e.g., providing SCG), with the MN and SN being connected via a network interface and at least the MN being connected to a core network (e.g., EPC or 5GC).

If the UE is operating in DC with an MN that provides the UE's MCG and with an SN that provides the UE's SCG, the UE can declare failure towards one of the MN and the SN while retaining the connection towards the other of the MN and the SN. For example, if the UE detects a failure in the SCG, the UE can directly send a report about this failure to MN. Likewise, if the UE detects a failure in the MCG, the UE can directly send a report about this failure to SN.

In some scenarios, a UE operating in RRC_IDLE or RRC_INACTIVE state in a cell may attempt to return to the RRC_CONNECTED state by establishing a connection with the network in the cell. In case the UE is unable to establish the connection, the UE may declare a connection establishment failure (CEF). If the UE was previously configured by the network to perform and log measurements while in RRC_IDLE or RRC_INACTIVE, the UE can store the measurements logged prior to the failure in a variable called VarConnEstFailReport. When sending certain RRC messages, the UE can indicate it has a stored CEF report by setting a connEstFailInfoAvailable field to "true". The network can request the UE to provide the CEF report by sending a UEInformationRequest message (e.g., in FIG. 5) with the connEstFailReportReq field set to "true". The UE will respond with a UEInformationResponse message that includes the indicated/requested failure report (e.g., connEstFailReport-r11 in FIG. 6C).

In addition, a UE in RRC_CONNECTED state can be configured by the network to perform logged MDT measurements in RRC_IDLE or RRC_INACTIVE (for NR) state and/or immediate MDT measurements while in RRC_CONNECTED state. For logged MDT, the UE receives a configuration in a LoggedMeasurementConfiguration message. For event-triggered logged MDT, the configuration includes an eventType and logginginterval. The UE logs the measurement reports at every logginginterval while in RRC_IDLE or RRC_INACTIVE state, so long as the event indicated in eventType is satisfied.

Figure 7:
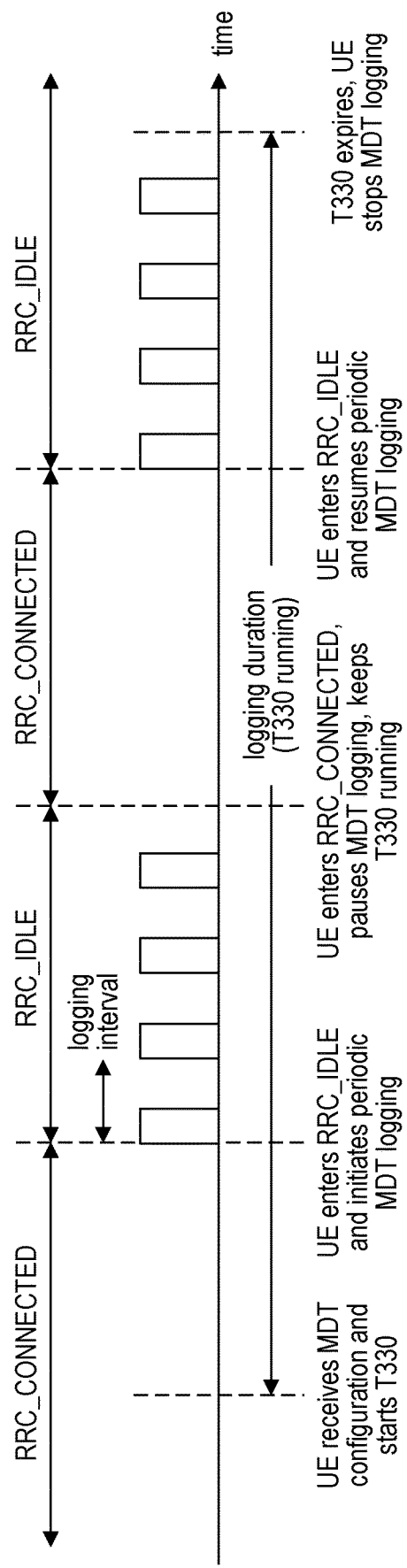
FIG. 7 shows an exemplary logged minimization of drive testing (MDT) procedure performed by a UE.

FIG. 7 shows an exemplary periodic logged MDT procedure performed by a UE. In this case, the received MDT configuration message includes a logginginterval and a loggingduration. The UE starts a timer (T330) set to loggingduration (e.g., 10-120 min) upon receiving the configuration, and performs periodic MDT logging every logginginterval (1.28-61.44 s) within the loggingduration while the UE is in RRC_IDLE state (or in RRC_INACTIVE, not shown). When the UE transitions to RRC_CONNECTED during the loggingduration, the UE pauses or stops the ongoing MDT measurement logging while leaving T330 running, and then resumes the MDT measurement logging with the same logginginterval upon returning to RRC_IDLE. The UE stops the logging upon expiration of T330.

During logging, the UE collects DL RS received strength and quality (i.e., RSRP, RSRQ) based on existing measurements required for cell reselection purposes. In other words, the UE is not required to perform additional LTE or NR measurements beyond those existing ones. The UE also logs detailed location information, WLAN measurements, and BT measurements, to the extent that these are available. The UE reports the logged information to the network when the UE returns to RRC_CONNECTED state.

FIG. 8A shows an ASN.1 data structure for an exemplary LoggedMeasurementConfiguration message. As shown in FIG. 8A, this configuration can include the logginginterval and loggingduration fields, as well as an areaConfiguration field that indicates a geographic area for which the UE is requested to perform measurement logging. FIG. 8B shows an ASN.1 data structure for an exemplary areaConfiguration field. Upon receiving such information, a UE camping on a cell will check if the cell is part of the area scope identified in areaConfiguration and will perform MDT logging if the serving cell is part of the area scope. If areaConfiguration is not present/configured, measurement logging is not restricted to specific cells or tracking areas but applies as long as the public land mobile network in which the UE is registered (referred to as "RPLMN") is included in a plmn-IdentityList stored in the UE's VarLogMeasReport.

The configuration shown in FIG. 8A also includes a traceReference, tce-Id, and traceRecordingSessionRef parameters that identify the trace collection entity (TCE) that originated the request and should receive the MDT report. FIG. 8C shows an ASN.1 data structure for an exemplary traceReference field, which includes a PLMN identity and a trace identifier.

After receiving a LoggedMeasurementConfiguration RRC message from the network, the UE stores the received configuration in the UE variable varLogMeasConfig. FIG. 9 shows an ASN.1 data structure for an exemplary VarLogMeasConfig variable and/or IE. In addition, the UE stores measurements logged according to this configuration in the UE variable VarLogMeasReport. FIG. 10 shows an ASN.1 data structure for an exemplary VarLogMeasReport variable and/or IE.

The network can request the UE to provide the logged measurement report by sending a UEInformationRequest message with the logMeasReportReq field (e.g., logMeasReportReq-r10 in FIG. 5) set to "true". The UE responds with a UEInformationResponse message that includes the indicated/requested logged measurement report (e.g., logMeasReport-r10 in FIG. 6A).

In contrast, a UE can be configured to perform and report immediate MDT measurements while in RRC_CONNECTED state. Similar to logged MDT, immediate MDT measurements are based on existing UE and/or network measurements performed while a UE is in RRC_CONNECTED, and can include any of the following measurement quantities:

M1: RSRP and RSRQ measurement by UE.
M2: Power Headroom measurement by UE.
M3: Received Interference Power measurement by eNB.
M4: Data Volume measurement separately for DL and UL, per QoS class indicator (QCI) per UE, by eNB.
M5: Scheduled IP layer Throughput for MDT measurement separately for DL and UL, per RAB per UE and per UE for the DL, per UE for the UL, by eNB.
M6: Packet Delay measurement, separately for DL and UL, per QCI per UE, see UL PDCP Delay, by the UE, and Packet Delay in the DL per QCI, by the eNB.
M7: Packet Loss rate measurement, separately for DL and UL per QCI per UE, by the eNB.
M8: received signal strength (RSSI) measurement by UE.
M9: round trip time (RTT) measurement by UE.

For example, the reporting of M1 measurements can be event-triggered according to existing RRM configuration for any of events A1-A6 or B1-B2. In addition, M1 reporting can be periodic, A2 event-triggered, or A2 event-triggered periodic according to an MDT-specific measurement configuration. As another example, the reporting of M2 measurements can be based on reception of Power Headroom Report (PHR), while reporting for M3-M9 can be triggered by the expiration of a measurement collection period.

In the various reporting scenarios discussed above, the UE can log location-related information (if available) as part of the MDT, RLF, CEF, and SCG failure reports. The location-related information logged by the UE can be UE position derived from global navigation satellite system (GNSS, e.g., GPS) measurements. In some cases, the UE can also include measurements made on various wireless LAN (e.g., 802.11) access points (APs) or Bluetooth (BT) beacons that are provided by the network as part of the measurement configuration. For example, the LoggedMeasurementConfiguration shown in FIG. 8A includes a bt-NameList-r15 and a wlan-NameList-r15, which are list of identifiers of BT beacons and WLAN APs, respectively.

In response, the UE can provide one or more measurements of the beacons/APs identified in those lists by the IEs logMeasResultListBT-r15 and logMeasResultListWLAN-r15, respectively. These IEs can be included in RLF-report-r9 (FIG. 6B), ConnEstFailReport-r11 (FIG. 6C), logMeasReport-r10 (FIG. 6A), and/or VarLogMeasReport-r10 (FIG. 10).

In some cases, however, a UE may not report one or more of this location-related information even if configured by the network to do so. This can be due to one of two conditions: 1) a corresponding UE receiver was disabled (e.g., turned off, powered down, inactive, non-operational, etc.) at time of measurement; or 2) a corresponding UE receiver (e.g., WLAN) was enabled (e.g., turned on, powered up, active, operational, etc.) at time of measurement, but the UE was unable to receive any signals of the particular type (e.g., from WLAN APs). Conventionally, the UE does not specify between these two conditions. This ambiguity creates problems, issues, and/or difficulties for the network, particularly in relation to determining coverage based on UE measurements, such as by machine learning (ML) algorithms that apply fingerprinting algorithms.

Accordingly, embodiments of the present disclosure provide novel, flexible, and efficient techniques for a UE to report additional status information of one or more of the UE's non-cellular receivers that correspond to the one or more types of non-cellular signals that are identified by the network in a measurement reporting configuration. For example, this status information can include any of the following:

the UE's WLAN receiver was disabled at the time of measurement logging;
the UE's Bluetooth receiver was disabled at the time of measurement logging;
the UE's GNSS receiver was disabled at the time of measurement logging;
the UE's WLAN receiver was enabled but the UE was out-of-coverage with respect to all of the identified WLAN APs at the time of measurement logging;
the UE's Bluetooth receiver was enabled but the UE was out-of-coverage with respect to all of the identified BT beacons at the time of measurement logging; and
the UE's GNSS receiver was enabled but the UE was unable to receive enough satellites to generate location information.

By receiving such information, the network can determine whether to use UE measurement reports (e.g., for RLF, CEF, SCG failure, MDT, etc.) that do not include certain non-cellular measurements configured/identified by the network. Consequently, this can improve a network's ability to perform remedial actions for cells in which a reported RLF, CEF, or SCG failure occurs, which can reduce and/or eliminate subsequent failures in such cells. Furthermore, such techniques can make MDT more robust by providing additional measurement information.

In various embodiments described below, a UE is requested or configured to indicate to the network the status of its WLAN, Bluetooth, and or GNSS (or other non-cellular) receivers for measurements. However, a network request is not required; in some embodiments, the UE can indicate to the network the various status of its non-cellular receivers without an explicit request. For example, this may be a default UE behavior. Furthermore, although Bluetooth, WLAN, and GNSS are used as examples, embodiments described herein could also be applied to any other non-cellular technologies for which the UE can perform measurements provided that the UE's receiver is enabled.

In the various embodiments described below, the UE can receive, from a cellular radio access network (RAN), a measurement reporting configuration including the following:

identification of non-cellular signals, of one or more types, for which measurements are requested from the UE, and
a request that the UE should report status of one or more non-cellular receivers, of the UE, that correspond to the one or more types of identified non-cellular signals.

For example, the identification of non-cellular signals can include either or both of the following:

wlan-NameList, specifying the set of WLAN APs that the UE shall include in the logged MDT report, if available; and
bt-NameList, specifying the set of BT beacons that the UE shall include in the logged MDT report, if available.

As another example, the request can be a single request for all types of non-cellular signals (e.g., nonCellularStatusReport), or individual requests for the respective types (e.g., wlanStatusReport, btStatusReport, gnssStatusReport).

In some embodiments, the measurement configuration can also include a measurement duration. The UE can then selectively measure at least the identified non-cellular signals during the measurement duration. For example, if the measurement reporting configuration includes wlan-NameList and bt-NameList, the UE can measure the signals identified by these lists as well as GNSS signals, which may not be specifically identified in the measurement reporting configuration. "Selectively measuring a signal" refers to the UE performing measurements on the signal based on whether certain conditions are met, as discussed in more detail below.

Subsequently, the UE can transmit, to the cellular RAN, a measurement report including one or more of the following for each particular type of identified non-cellular signal (i.e., the types of cellular signals identified in the reporting configuration):

a first indication of whether the UE's corresponding non-cellular receiver was enabled during the measurement duration, and
a second indication of whether the UE was out-of-coverage during the measurement duration in relation to all identified non-cellular signals of the particular type.

In various embodiments, the first and/or second indications can indicate any of the following:

If the UE's WLAN receiver was enabled during the measurement duration, set a wlanStatus to indicate "ON" else set the wlanStatus to indicate "OFF".

If the UE's Bluetooth receiver was enabled during the measurement duration, set a btStatus to indicate "ON" else set the btStatus to indicate "OFF".

If the UE's GNSS receiver was enabled during the measurement duration (e.g., if the UE had location services enabled), set a gpsStatus to indicate "ON" else set the gpsStatus to indicate "OFF".

If the UE's WLAN receiver was enabled during the measurement duration and the UE was unable to receive and/or measure signals from any of the WLAN APs identified in wlan-NameList, then set an outOfWLANCoverage to be "TRUE", else do one of the following:
- set outOfWLANCoverage to be "FALSE"; or
- include available measurements (i.e., from the measurement duration) for one or more WLAN APs identified in wlan-NameList.

If the UE's BT receiver was enabled during the measurement duration and the UE was unable to receive and/or measure signals from any of the BT beacons identified in bt-NameList, then set an outOfBTCoverage to be "TRUE", else do one of the following:
- set outOfBTCoverage to be "FALSE"; or
- include available measurements (i.e., from the measurement duration) for one or more BT beacons identified in bt-NameList.

If the UE's GNSS receiver was enabled during the measurement duration (e.g., if the UE had location services enabled) and the UE was unable to receive enough GNSS signals to determine a UE location, set outOfGNSSCoverage to be "TRUE", else do one of the following:
- set outOfGNSSCoverage to be "FALSE", or
- include a CommonLocationInfo IE with a UE position based on GNSS measurements.

In some embodiments, these techniques can be applied to logged MDT reporting. In such embodiments, the UE can receive a logged measurement configuration when the UE is in an active (e.g., RRC_CONNECTED) state. The measurement configuration includes one or more of the following:
- the identification of non-cellular signals;
- the request;
- a measurement/logging duration, specifying for how long the UE should keep logging measurements; and
- a logging interval, specifying the amount of time the UE waits between successive logging of the measurements during the logging duration.

Subsequently, the UE can transition to a non-active state (e.g., RRC_IDLE or RRC_INACTIVE), such as upon receiving an RRCConnectionRelease/RRCRelease message. While in the non-active state, for every logging interval, the UE can determine values for the first and/or second indications for each non-cellular receiver corresponding to an identified type of non-cellular signal.

Subsequently, when the UE returns to the active state (e.g., RRC_CONNECTED, such as upon arrival of UL data, paging due to DL data, need to update tracking area, etc.), the UE can send the logged values of the first and/or second indications to the network. For example, the UE can perform the following operations:

Sending the RRCConnectionResumeRequest/RRCResumeRequest or RRCConnectionSetupRequest/RRCSetupRequest message to the network Transitioning to the RRC_CONNECTED state upon receiving RRCConnectionResume/RRCResume or RRCConnectionSetup/RRCSetup message from the network Indicating the availability of logged MDT measurements in the RRCConnectionResume/RRCResume, RRCReestablishmentComplete/RRCConnection-ReestablishmentComplete, RRCReconfigurationComplete/RRCConnection-ReconfigurationComplete or RRCConnectionSetup/RRCSetup message via logMeasAvailable flag.

Receiving a UEInformationRequest that includes a logMeasReportReq, and reporting the logged MDT measurements in UEInformationResponse, which includes measurements performed based on LoggedMeasurementConfiguration.

In some embodiments, these techniques can be applied to immediate MDT reporting. In such embodiments, the UE can receive a measurement configuration when the UE is in an active (e.g., RRC_CONNECTED) state. The measurement configuration includes one or more of the following:
- the identification of non-cellular signals;
- the request;
- a reporting configuration indicating that the UE should include location information in the measurement report.

While in the active state, the UE can determine values for the first and/or second indications for each non-cellular receiver corresponding to an identified type of non-cellular signal. Subsequently, after the measurements are complete, the UE can transmit the measurement report to the network, including the values for the first and/or second indications.

In some embodiments, these techniques can be applied to RLF reporting. In such embodiments, the UE can receive a measurement configuration when the UE is in an active (e.g., RRC_CONNECTED) state. The measurement configuration can include the identification of non-cellular signals and the request.

While in the active state, the UE can declare an RLF for its connection to the network. This can be due to any of the reasons discussed above. The UE can then generate a RLF report that includes the first and/or second indications. Subsequently, when the UE returns to the active state (e.g., RRC_CONNECTED, such as upon arrival of UL data, paging due to DL data, need to update tracking area, etc.), the UE can send the determined values of the first and/or second indications to the network. For example, the UE can perform the following operations:

Sending RRCConnectionResumeRequest/RRCResumeRequest or RRCConnectionSetup-Request/RRCSetupRequest message to the network;

Transitioning to the RRC_CONNECTED state upon receiving RRCConnectionResume/RRCResume or RRCConnectionSetup/RRCSetup message from the network;

Indicating the availability of an RLF report in the RRCConnectionResume/RRCResume, RRCReestablishmentComplete/RRCConnection-ReestablishmentComplete, RRC-ReconfigurationComplete/RRCConnection-ReconfigurationComplete or RRCConnection-Setup/RRCSetup message via rlfReportAvailable flag; and Receiving a UEInformationRequest that includes a rlf-ReportReq, and reporting the RLF information in UEInformationResponse.

In some embodiments, these techniques can be applied to CEF reporting. In such embodiments, the UE can receive a measurement configuration when the UE is in an active (e.g., RRC_CONNECTED) state. The measurement configuration can include the identification of non-cellular signals and the request.

The UE can subsequently transition its connection to an inactive state (e.g., RRC_IDLE or RRC_INACTIVE), such as in response to receiving an RRCConnectionRelease/RRCRelease message. After some period, the UE may attempt to return to the connection to an active state (e.g., RRC_CONNECTED, such as upon arrival of UL data, paging due to DL data, need to update tracking area, etc.). In doing so, however, the UE may experience a CEF and log a corresponding CEF report that includes the first and/or second indications. After the UE successfully returns its connection to the network to the active state, the UE can send the determined values of the first and/or second indications to the network. For example, the UE can perform the following operations:

Sending RRCConnectionResumeRequest/RRCResumeRequest or RRCConnectionSetup-Request/RRCSetupRequest message to the network;

Transitioning to the RRC_CONNECTED state upon receiving RRCConnectionResume/RRCResume or RRCConnectionSetup/RRCSetup message from the network;

Indicating the availability of a CEF report in the RRC-ConnectionResume/RRCResume, RRCReestablishmentComplete/RRCConnection-ReestablishmentComplete, RRC-ReconfigurationComplete/RRCConnection-ReconfigurationComplete or RRCConnection-Setup/RRCSetup message via cefReportAvailable flag; and Receiving a UEInformationRequest that includes a cefReportReq, and reporting the CEF information in UEInformationResponse.

While in the active state, the UE can declare an RLF for its connection to the network. This can be due to any of the reasons discussed above. The UE can then generate a RLF report that includes the first and/or second indications. Subsequently, when the UE returns to the active state (e.g., RRC_CONNECTED, such as upon arrival of UL data, paging due to DL data, need to update tracking area, etc.), the UE can send the determined values of the first and/or second indications to the network. For example, the UE can perform the following operations:

Sending RRCConnectionResumeRequest/RRCResumeRequest or RRCConnectionSetup-Request/RRCSetupRequest message to the network;

Transitioning to the RRC_CONNECTED state upon receiving RRCConnectionResume/RRCResume or RRCConnectionSetup/RRCSetup message from the network Indicating the availability of an RLF report in the RRC-ConnectionResume/RRCResume, RRCReestablishmentComplete/RRCConnection-ReestablishmentComplete, RRC-ReconfigurationComplete/RRCConnection-ReconfigurationComplete or RRCConnection-Setup/RRCSetup message via rlfReportAvailable flag.

Receiving a UEInformationRequest that includes a rlfReportReq, and reporting the RLF information in UEInformationResponse.

In some embodiments, these techniques can be applied to SCG failure reporting. In such embodiments, the UE can receive a measurement configuration when the UE is in an active (e.g., RRC_CONNECTED) state and in dual connectivity with MN and SN. The measurement configuration can include the identification of non-cellular signals and the request and can be received from the MN and/or the SN.

While in the active state, the UE can declare an RLF for the SN, e.g., the SCG. This can be due to any of the reasons discussed above. The UE can then generate an SCG failure information message that includes the first and/or second indications, which the UE can transmit to the MN (i.e., since the connection to the MN is still in the active state).

In some embodiments, these techniques can be applied to MCG failure reporting. In such embodiments, the UE can receive a measurement configuration when the UE is in an active (e.g., RRC_CONNECTED) state and in dual connectivity with MN and SN. The measurement configuration can include the identification of non-cellular signals and the request and can be received from the MN and/or the SN.

While in the active state, the UE can declare an RLF for the MN, e.g., the MCG. This can be due to any of the reasons discussed above. The UE can then generate an MCG failure information message that includes the first and/or second indications, which the UE can transmit to the SN (i.e., since the connection to the SN is still in the active state).

The above-described embodiments can be implemented in various cellular radio access network (RANs), such as E-UTRANs and NG-RANs. Even so, FIGS. 11-14 show ASN.1 data structures of messages and/or IEs that can be used with NG-RAN embodiments. More specifically, the ASN.1 data structures shown in FIGS. 11-14 can be included in 3GPP TS 38.331, the RRC specification for NR.

FIG. 11 shows an ASN.1 data structure for an exemplary LoggedMeasurement-Configuration message, according to various embodiments of the present disclosure. In particular, the exemplary message shown in FIG. 11 includes three separate requests for status reports of non-cellular receivers, i.e., wlanStatusReport, btStatusReport, gnssStatusReport. Each of these is an optional Boolean variable. In some cases, the Boolean value can have a first value indicating that the network is requesting status for the corresponding non-cellular receiver, and a second value indicating no status request. Alternately, the network can refrain from including a particular Boolean variable when status is not requested for the corresponding non-cellular receiver.

FIG. 12 shows an ASN.1 data structure for an exemplary CommonLocationInfo IE, according to various embodiments of the present disclosure. In particular, the exemplary IE shown in FIG. 12 includes a gnssStatus field having enumerated values of "ON" and "OFF", and an outOfGNSSCoverage field having enumerated values of "TRUE" and "FALSE". Each field is optional such that the UE can include either or both, e.g., based on the request from the network.

FIG. 13 shows an ASN.1 data structure for an exemplary LogMeasResultListBT IE, according to various embodiments of the present disclosure. In particular, the exemplary IE shown in FIG. 13 includes a btStatus field having enumerated values of "ON" and "OFF", and an outOfBTCoverage field having enumerated values of "TRUE" and "FALSE". Each field is optional such that the UE can include either or both, e.g., based on the request from the network.

FIG. 14 shows an ASN.1 data structure for an exemplary LogMeasResultListWLAN IE, according to various embodiments of the present disclosure. In particular, the exemplary IE shown in FIG. 14 includes a wlanStatus field having enumerated values of "ON" and "OFF", and an outOfWLANCoverage field having enumerated values of "TRUE" and "FALSE". Each field is optional such that the UE can include either or both, e.g., based on the request from the network.

In various embodiments, a network node may apply different behaviors for the measurement results based on the non-cellular receiver status indicated by the respective UEs (e.g., via the first and/or second indications). For example, when a UE measurement report indicates that at least one UE non-cellular receiver (i.e., corresponding to at least one type of non-cellular signal identified in the measurement configuration) was not enabled during the measurement duration, the network can discard at least a portion of the measurements that are included in the measurement report. As more specific sub-examples, the network can discard measurements of one or more cells of the RAN and/or measurements of other types of identified non-cellular signals. This can include all measurements or only measurements in the same coverage area of the non-cellular signals for which the UE's corresponding receiver was indicated as not enabled.

As another example, when a UE measurement report indicates that at least one UE non-cellular receiver (i.e., corresponding to at least one type of non-cellular signal identified in the measurement configuration) was not enabled during the measurement duration, the network can combine the measurements included in the measurement report with measurements included in further measurement reports (e.g., from the UE and/or from other UEs) that include the same indication (i.e., that the same at least one UE non-cellular receiver was enabled). As a more specific sub-example, a first measurement reported indicating Bluetooth enabled but WLAN disabled would be combined with other measurement reports that indicated Bluetooth enabled but WLAN disabled.

As another example, the measurements can be input to a machine learning algorithm that uses the presence or absence of WLAN and/or Bluetooth coverage (e.g., absence with indication that a UE had its WLAN and/or Bluetooth enabled but could not find the identified signals) to estimate the coverage on other RATs/frequencies of a RAT (e.g., cells in the RAN) and/or to estimate the UE's location based on the finger printing algorithms, etc.

Figure 15:
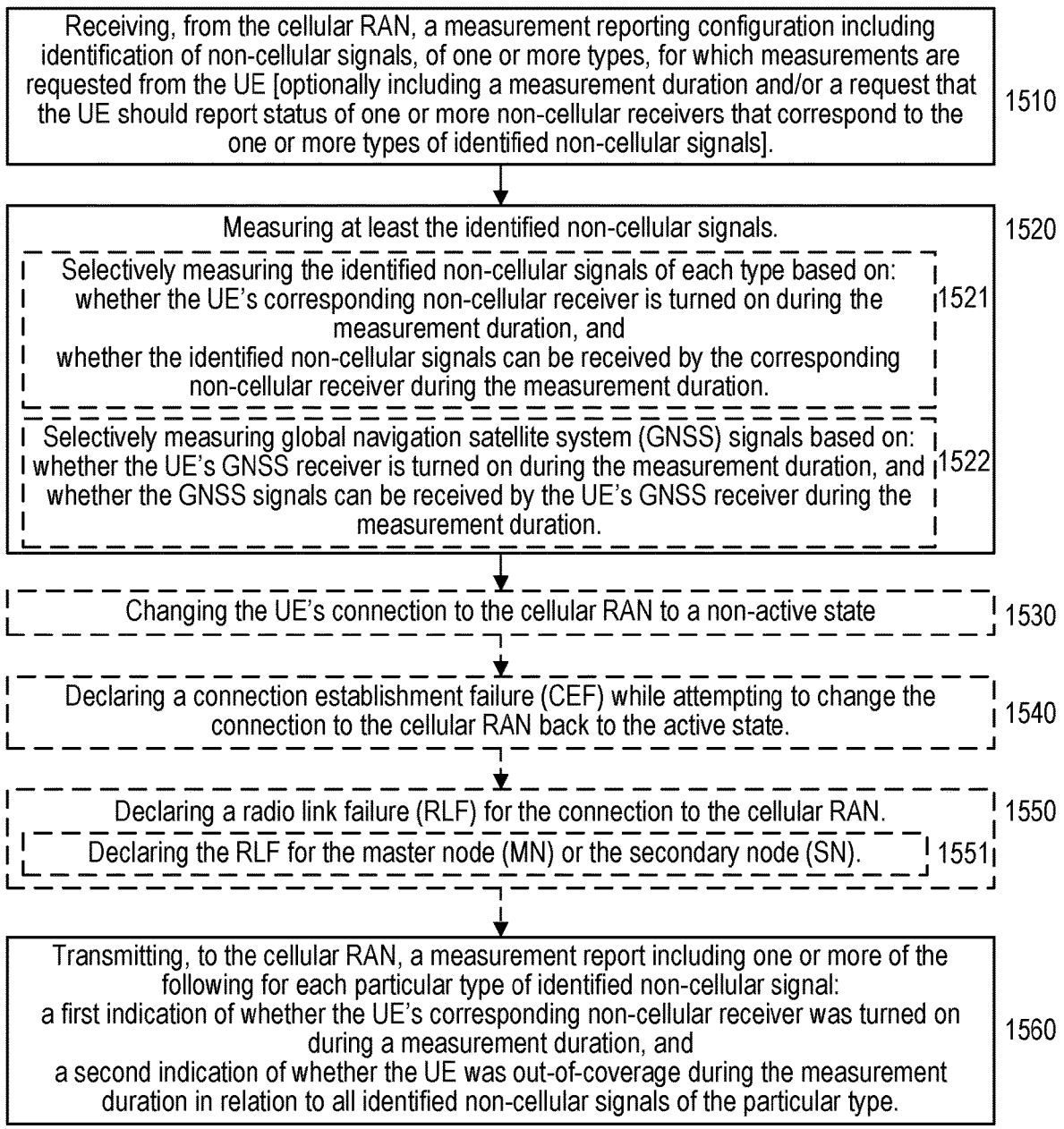
FIG. 15 shows a flow diagram of an exemplary method (e.g., procedure) for a UE (e.g., wireless device, MTC device, NB-IoT device, modem, etc. or component thereof), according to various embodiments of the present disclosure.
Figure 16:
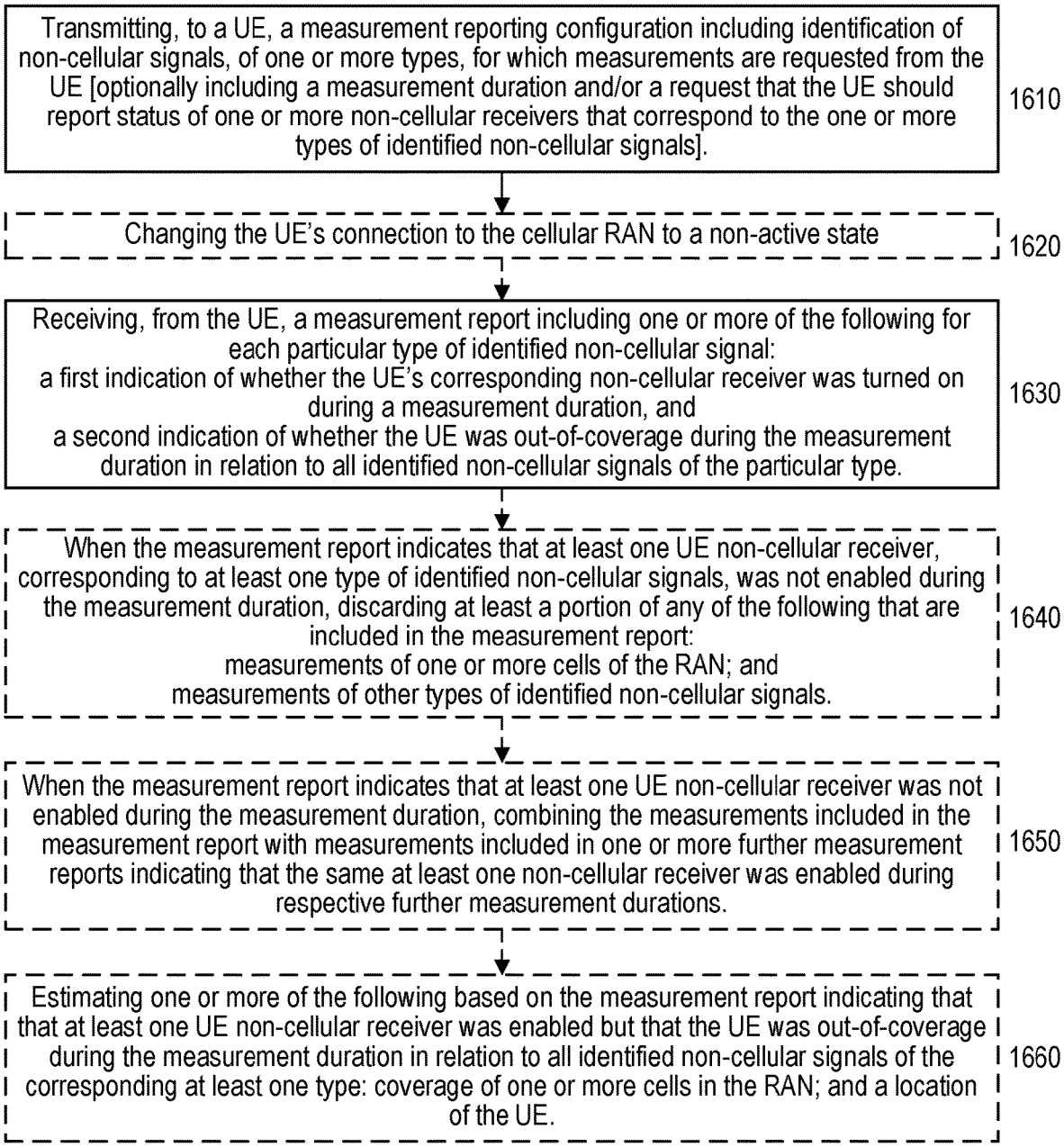
FIG. 16 shows a flow diagram of an exemplary method (e.g., procedure) for a network node (e.g., base station, eNB, gNB, ng-eNB, en-gNB, etc. or component thereof), according to various embodiments of the present disclosure.

The embodiments described above can be further illustrated with reference to FIGS. 15-16, which show exemplary methods (e.g., procedures) for a UE and a network node, respectively. In other words, various features of operations described below correspond to various embodiments described above. These exemplary methods can be used cooperatively to provide various exemplary benefits and/or advantages. Although FIGS. 15-16 show specific blocks in particular orders, the operations of the respective methods can be performed in different orders than shown and can be combined and/or divided into blocks having different functionality than shown. Optional blocks or operations are indicated by dashed lines.

In particular, FIG. 15 shows a flow diagram of an exemplary method (e.g., procedure) for a UE operating in a cellular RAN, according to various embodiments of the present disclosure. The exemplary method can be performed by a UE (e.g., wireless device, MTC device, NB-IoT device, modem, etc. or component thereof) such as described elsewhere herein.

The exemplary method can include the operations of block 1510, in which the UE can receive, from the cellular RAN, a measurement reporting configuration that includes identification of non-cellular signals, of one or more types, for which measurements are requested from the UE. The exemplary method can also include the operations of block 1520, in which the UE can measure at least the identified non-cellular signals. For example, if the measurement reporting configuration includes wlan-NameList and bt-NameList (discussed above), the UE can measure the signals identified by these lists as well as GNSS signals, which may not be specifically identified in the measurement reporting configuration.

The exemplary method can also include the operations of block 1560, in which the UE can transmit, to the cellular RAN, a measurement report including one or more of the following for each particular type of identified non-cellular signal:
a first indication of whether the UE's corresponding non-cellular receiver was enabled during a measurement duration, and
a second indication of whether the UE was out-of-coverage during the measurement duration in relation to all identified non-cellular signals of the particular type.

In some embodiments, the identification of the non-cellular signals includes a first list of WLAN access point identifiers and a second list of BT beacon identifiers. An example is illustrated in FIG. 11.

In some embodiments, the measurement reporting configuration can also include one or more of the following: the measurement duration; and a request that the UE should report status of one or more non-cellular receivers that correspond to the one or more types of identified non-cellular signals.

In some embodiments, the measuring operations in block 1520 can include the operations of block 1521, where the UE can selectively measure the identified non-cellular signals of each particular type based on whether the UE's corresponding non-cellular receiver is enabled during the measurement duration, and on whether the identified non-cellular signals can be received by the corresponding non-cellular receiver during the measurement duration.

In some embodiments, for each particular type of identified non-cellular signal, when the UE's corresponding non-cellular receiver was enabled during the measurement duration, one or more of the following applies:
the second indication is included in the measurement report and the first indication is not included in the measurement report; and
the second indication comprises a variable having a first value indicating the UE was out-of-coverage in relation to all identified non-cellular signals of the particular type.

In some of these embodiments, for each particular type of identified non-cellular signal, when the UE's corresponding non-cellular receiver was enabled during the measurement duration, the second indication further comprises one of the following indicating the UE was in-coverage in relation to at least one identified non-cellular signal of the particular type: a second value of the variable; or measurements of the at least one identified non-cellular signal.

Various examples of such embodiments are illustrated in FIGS. 13-14.

In some embodiments, the measuring operations in block 1520 can include the operations of block 1522, where the UE can selectively measure GNSS signals based on whether the UE's GNSS receiver is enabled during the measurement duration, and whether GNSS signals can be received by the UE's GNSS receiver during the measurement duration. In such embodiments, the measurement report (e.g., transmitted in block 1560) can include one or more of the following:

a third indication of whether the UE's GNSS receiver was enabled during the measurement duration, and a fourth indication of whether the UE was out-of-coverage during the measurement duration in relation to GNSS signals.

In some embodiments, when the UE's GNSS receiver was enabled during the measurement duration, the fourth indication can be included in and the third indication can be excluded from the measurement report. In some of these embodiments, when the UE's GNSS receiver was enabled during the measurement duration, the fourth indication can comprise:

a variable having a first value indicating the UE was out-of-coverage in relation to GNSS signals; and one of the following indicating the UE was in-coverage in relation to GNSS signals: a second value of the variable or a UE location based on measurements of the GNSS signals.

In some embodiments, the identified non-cellular signals can at least partially overlap in coverage with one or more cells of the RAN. In such case, the measurement report can also include measurements for the one or more cells of the RAN.

In some embodiments, the measurement reporting configuration can be received (e.g., in block 1510) and/or the measuring operations can be performed (e.g., in block 1520) while the UE's connection to the cellular RAN is in an active state (e.g., RRC_CONNECTED). An example use of such embodiments is immediate MDT, discussed above.

In some of these embodiments, the exemplary method can also include the operations of block 1530, where the UE can change the connection to the cellular RAN to a non-active state (e.g., RRC_IDLE or RRC_INACTIVE). In such embodiments, the measurement report can be transmitted (e.g., in block 1560) after changing the connection to the cellular RAN from the non-active state back to the active state. Variants of these embodiments will be described below.

In some variants, the measurement duration comprises a plurality of logging intervals while the UE's connection to the cellular RAN is in the non-active state. In such variants, the measuring operations (e.g., in block 1520) can be performed at the plurality of logging intervals. An example use of such embodiments is logged MDT, discussed above. In some of these variants, the measurement report can include one or more of the following for each particular logging interval and for each particular type of identified non-cellular signal:

a first indication of whether the corresponding non-cellular receiver was enabled during the particular logging interval, and a second indication of whether the UE was out-of-coverage during the particular logging interval in relation to all identified non-cellular signals of the particular type.

In other variants, the exemplary method can also include the operations of block 1540, where the UE can declare a CEF while attempting to change the connection to the cellular RAN back to the active state. In such variants, the measuring operations (e.g., in block 1520) can be performed during a period immediately before the declaring CEF, while the measurement report can be transmitted (e.g., in block 1560) after subsequently changing the connection to the cellular RAN back to the active state.

In other of these embodiments, the exemplary method can also include the operations of block 1550, where the UE can declare a RLF for the connection to the cellular RAN. In such embodiments, the measuring operations (e.g., in block 1520) can be performed during a period immediately before declaring the RLF. In some variants (e.g., single connectivity), the measurement report can be transmitted upon reestablishing the connection to the cellular RAN after the RLF.

In other variants, the connection to the cellular RAN can be dual connectivity with a master node (MN) and with a secondary node (SN). In such variants, the measurement configuration can be received from one or more of the MN and the SN. In addition, declaring the RLF in block 1550 can include the operations of sub-block 1551, where the UE can declare the RLF for one of the MN and the SN. In such case, the measurement report is transmitted as a failure information message to the other of the MN and SN.

In addition, FIG. 16 shows a flow diagram of an exemplary method (e.g., procedure) for a network node in a cellular RAN, according to various embodiments of the present disclosure. The exemplary method shown in FIG. 16 can be performed by a network node (e.g., base station, eNB, gNB, ng-eNB, en-gNB, etc. or component thereof) described elsewhere herein, including in relation to other figures.

The exemplary method can include the operations of block 1610, in which the network node can transmit, to a user equipment (UE), a measurement reporting configuration including identification of non-cellular signals, of one or more types, for which measurements are requested from the UE. The exemplary method can also include the operations of block 1630, in which the network node can receive, from the UE, a measurement report including one or more of the following for each particular type of identified non-cellular signal:

a first indication of whether the UE's corresponding non-cellular receiver was enabled during a measurement duration, and a second indication of whether the UE was out-of-coverage during the measurement duration in relation to all identified non-cellular signals of the particular type.

In some embodiments, the identification of the non-cellular signals includes a first list of WLAN access point identifiers and a second list of BT beacon identifiers. An example is illustrated in FIG. 11.

In some embodiments, the measurement reporting configuration can also include one or more of the following: the measurement duration; and a request that the UE should report status of one or more non-cellular receivers that correspond to the one or more types of identified non-cellular signals.

In some embodiments, for each particular type of identified non-cellular signal, when the UE's corresponding non-cellular receiver was enabled during the measurement duration, one or more of the following applies:

the second indication is included in the measurement report and the first indication is not included in the measurement report; and the second indication comprises a variable having a first value indicating the UE was out-of-coverage in relation to all identified non-cellular signals of the particular type.

In some of these embodiments, for each particular type of identified non-cellular signal, when the UE's corresponding non-cellular receiver was enabled during the measurement duration, the second indication further comprises one of the following indicating the UE was in-coverage in relation to at least one identified non-cellular signal of the particular type:

a second value of the variable; or measurements of the at least one identified non-cellular signal.

In some embodiments, the measurement report can also include one or more of the following:
- a third indication of whether the UE's GNSS receiver was enabled during the measurement duration, and
- a fourth indication of whether the UE was out-of-coverage during the measurement duration in relation to GNSS signals.

In some embodiments, when the UE's GNSS receiver was enabled during the measurement duration, the fourth indication can be included in and the third indication can be excluded from the measurement report. In some of these embodiments, when the UE's GNSS receiver was enabled during the measurement duration, the fourth indication can comprise:
- a variable having a first value indicating the UE was out-of-coverage in relation to GNSS signals; and
- one of the following indicating the UE was in-coverage in relation to GNSS signals: a second value of the variable or a UE location based on measurements of the GNSS signals.

In some embodiments, the identified non-cellular signals can at least partially overlap in coverage with one or more cells of the RAN. In such case, the measurement report can also include measurements for the one or more cells of the RAN.

In some embodiments, the measurement reporting configuration can be transmitted (e.g., in block 1610) and/or the measurement duration can occur while the UE's connection to the cellular RAN is in an active state (e.g., RRC_CONNECTED). In other embodiments, the exemplary method can also include the operations of block 1620, where the network node can change the UE's connection to the cellular RAN to a non-active state (e.g., RRC_IDLE or RRC_INACTIVE). In such embodiments, the measurement report can be received (e.g., in block 1630) after changing the UE's connection to the cellular RAN from the inactive state back to the active state. Variants of these embodiments will be described below.

In some variants, the measurement duration comprises a plurality of logging intervals while the UE's connection to the cellular RAN is in the non-active state. In such variants, the measurement report can include one or more of the following for each particular logging interval and for each particular type of identified non-cellular signal:
- a first indication of whether the UE's corresponding non-cellular receiver was enabled during the particular logging interval, and
- a second indication of whether the UE was out-of-coverage during the particular logging interval in relation to all identified non-cellular signals of the particular type.

In other variants, the measurement report can indicate a CEF that occurred while the UE attempted to change the connection to the cellular RAN back to the active state. In such variants, the measurement duration comprises a period immediately before the UE declared the CEF.

In other variants, the measurement report can indicate a RLF that occurred when the UE's connection to the cellular RAN was in the active state. In such variants, the measurement duration comprises a period immediately before the UE declared the RLF. In some of these variants, the measurement report can be received upon reestablishing the UE's connection to the cellular RAN after the RLF. In other of these variants, the UE's connection to the cellular RAN can be dual connectivity with an MN and an SN. In such variants, the measurement report indicates that the RLF occurred for one of the MN and SN, while the network node (e.g., receiving the measurement report) is the other of the MN and SN.

In some embodiments, the exemplary method can also include the operations of block 1640, where when the measurement report indicates that at least one UE non-cellular receiver, corresponding to at least one type of identified non-cellular signals, was not enabled during the measurement duration, the network node can discard at least a portion of any of the following that are included in the measurement report: measurements of one or more cells of the RAN; and measurements of other types of identified non-cellular signals. In various embodiments, the discarding operations can be performed for all included measurements or only for included measurements in the same coverage area as the at least one type of identified non-cellular signals.

In other embodiments, the exemplary method can also include the operations of block 1650, where when the measurement report indicates that at least one UE non-cellular receiver, corresponding to at least one type of identified non-cellular signals, was not enabled during the measurement duration, the network node can combine the measurements included in the measurement report with measurements included in one or more further measurement reports indicating that the same at least one non-cellular receiver was enabled during respective further measurement durations.

For example, the identification of the non-cellular signals can include a first list of WLAN access point identifiers and a second list of BT beacon identifiers. When the measurement report indicates that the UE's BT receiver was enabled and that the UE's WLAN receiver was not enabled during the measurement duration, the network node can combine the measurements in the measurement report with measurements in other measurements reports that indicate BT enabled and WLAN disabled.

In other embodiments, the exemplary method can also include the operations of block 1660, where the network node can estimate one or more of the following based on the measurement report indicating that that at least one UE non-cellular receiver was enabled (e.g., via first indication) but that the UE was out-of-coverage during the measurement duration in relation to all identified non-cellular signals of the corresponding at least one type (e.g., via second indication): coverage of one or more cells in the RAN and/or a location of the UE.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 17:
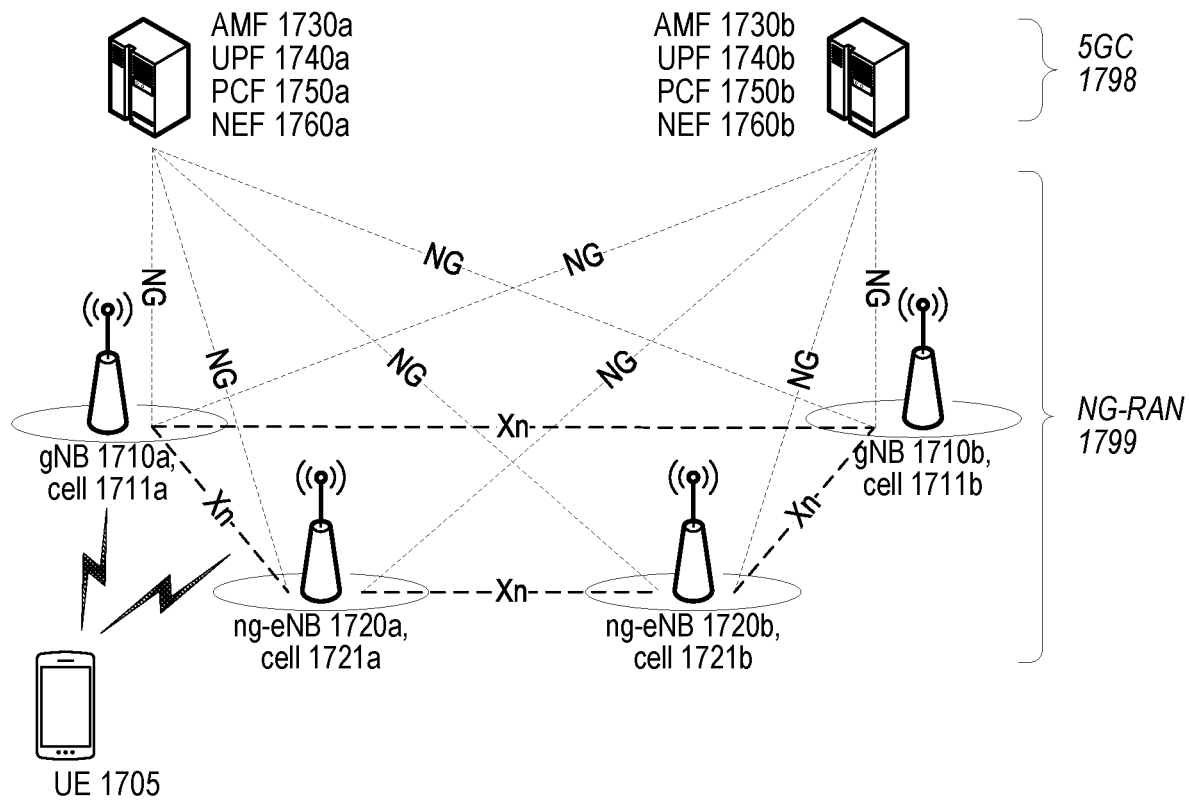
FIG. 17 shows a high-level view of an exemplary 5G network architecture.

FIG. 17 shows a high-level view of an exemplary 5G network architecture, including a Next Generation Radio Access Network (NG-RAN) 1799 and a 5G Core (5GC) 1798. As shown in the figure, NG-RAN 1799 can include gNBs 1710 (e.g., 1710a,b) and ng-eNBs 1720 (e.g., 1720a, b) that are interconnected with each other via respective Xn interfaces. The gNBs and ng-eNBs are also connected via the NG interfaces to 5GC 1798, more specifically to the AMF (Access and Mobility Management Function) 1730 (e.g., AMFs 1730a,b) via respective NG-C interfaces and to the UPF (User Plane Function) 1740 (e.g., UPFs 1740a,b) via respective NG-U interfaces. Moreover, the AMFs 1730a,b can communicate with one or more policy control functions (PCFs, e.g., PCFs 1750*a,b*) and network exposure functions (NEFs, e.g., NEFs 1760*a,b*).

Each of the gNBs 1710 can support the NR radio interface including frequency division duplexing (FDD), time division duplexing (TDD), or a combination thereof. In contrast, each of ng-eNBs 1720 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 1711*a-b* and 1721*a-b* shown as exemplary in FIG. 17. As mentioned above, the gNBs and ng-eNBs can also use various directional beams to provide coverage in the respective cells. Depending on the particular cell in which it is located, a UE 1705 can communicate with the gNB or ng-eNB serving that particular cell via the NR or LTE radio interface, respectively.

Each of gNBs 1710*a,b* can include a central (or centralized) unit (CU or gNB-CU) and one or more distributed (or decentralized) units (DU or gNB-DU). CUs are logical nodes that host higher-layer protocols and perform various gNB functions such controlling the operation of DUs. Likewise, DUs are logical nodes that hosts lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. A gNB-CU connects to its gNB-DUs over respective F1 logical interfaces, but a gNB-CU and connected gNB-DUs are only visible to other gNBs and the 5GC as a gNB. In other words, the F1 interface is not visible beyond a gNB-CU.

Figure 18:
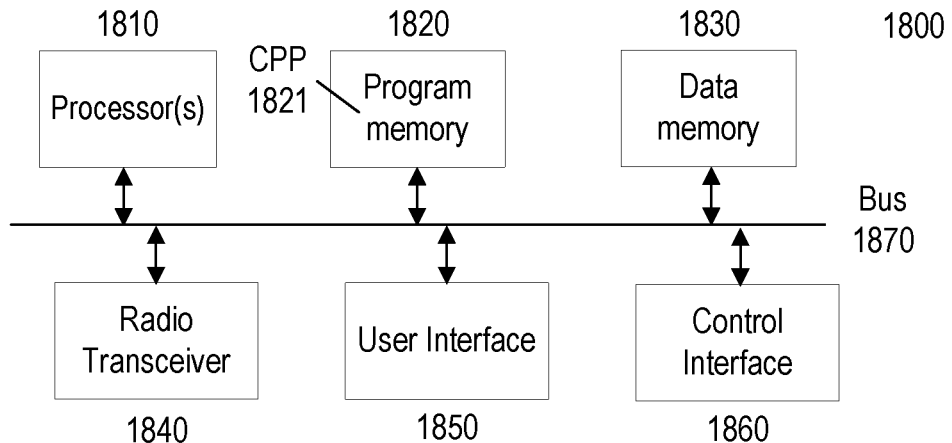
FIG. 18 shows a block diagram of an exemplary wireless device or UE, according to various embodiments of the present disclosure.

FIG. 18 shows a block diagram of an exemplary wireless device or user equipment (UE) 1800 (hereinafter referred to as "UE 1800") according to various embodiments of the present disclosure, including those described above with reference to other figures. For example, UE 1800 can be configured by execution of instructions, stored on a computer-readable medium, to perform operations corresponding to one or more of the exemplary methods and/or procedures described above.

UE 1800 can include a processor 1810 (also referred to as "processing circuitry") that can be operably connected to a program memory 1820 and/or a data memory 1830 via a bus 1870 that can comprise parallel address and data buses, serial ports, or other methods and/or structures known to those of ordinary skill in the art. Program memory 1820 can store software code, programs, and/or instructions (collectively shown as computer program product (CPP) 1821 in FIG. 18) that, when executed by processor 1810, can configure and/or facilitate UE 1800 to perform various operations, including operations described below. For example, execution of such instructions can configure and/or facilitate UE 1800 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1840, user interface 1850, and/or control interface 1860.

As another example, processor 1810 can execute program code stored in program memory 1820 that corresponds to MAC, RLC, PDCP, and RRC layer protocols standardized by 3GPP (e.g., for NR and/or LTE). As a further example, processor 1810 can execute program code stored in program memory 1820 that, together with radio transceiver 1840, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1810 can execute program code stored in program memory 1820 that, together with radio transceiver 1840, implements device-to-device (D2D) communications with other compatible devices and/or UEs.

Program memory 1820 can also include software code executed by processor 1810 to control the functions of UE 1800, including configuring and controlling various components such as radio transceiver 1840, user interface 1850, and/or host interface 1860. Program memory 1820 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1820 can comprise an external storage arrangement (not shown) remote from UE 1800, from which the instructions can be downloaded into program memory 1820 located within or removably coupled to UE 1800, so as to enable execution of such instructions.

Data memory 1830 can include memory area for processor 1810 to store variables used in protocols, configuration, control, and other functions of UE 1800, including operations corresponding to, or comprising, any of the exemplary methods and/or procedures described herein. Moreover, program memory 1820 and/or data memory 1830 can include non-volatile memory (e.g., flash memory), volatile memory (e.g., static or dynamic RAM), or a combination thereof. Furthermore, data memory 1830 can comprise a memory slot by which removable memory cards in one or more formats (e.g., SD Card, Memory Stick, Compact Flash, etc.) can be inserted and removed.

Persons of ordinary skill will recognize that processor 1810 can include multiple individual processors (including, e.g., multi-core processors), each of which implements a portion of the functionality described above. In such cases, multiple individual processors can be commonly connected to program memory 1820 and data memory 1830 or individually connected to multiple individual program memories and or data memories. More generally, persons of ordinary skill in the art will recognize that various protocols and other functions of UE 1800 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1840 can include radio-frequency transmitter and/or receiver functionality that facilitates the UE 1800 to communicate with other equipment supporting like wireless communication standards and/or protocols. In some exemplary embodiments, the radio transceiver 1840 includes one or more transmitters and one or more receivers that enable UE 1800 to communicate according to various protocols and/or methods proposed for standardization by 3GPP and/or other standards bodies. For example, such functionality can operate cooperatively with processor 1810 to implement a PHY layer based on OFDM, OFDMA, and/or SC-FDMA technologies, such as described herein with respect to other figures.

In some exemplary embodiments, radio transceiver 1840 includes one or more transmitters and one or more receivers that can facilitate the UE 1800 to communicate with various LTE, LTE-Advanced (LTE-A), and/or NR networks according to standards promulgated by 3GPP. In some exemplary embodiments of the present disclosure, the radio transceiver 1840 includes circuitry, firmware, etc. necessary for the UE 1800 to communicate with various NR, NR-U, LTE, LTE-A, LTE-LAA, UMTS, and/or GSM/EDGE networks, also according to 3GPP standards. In some embodiments, radio transceiver 1840 can include circuitry supporting D2D communications between UE 1800 and other compatible devices.

In some embodiments, radio transceiver 1840 includes circuitry, firmware, etc. necessary for the UE 1800 to communicate with various CDMA2000 networks, according to 3GPP2 standards. In some embodiments, the radio transceiver 1840 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1840 can include a transceiver that is capable of wired communication, such as by using IEEE 802.3 Ethernet technology. The functionality particular to each of these embodiments can be coupled with and/or controlled by other circuitry in the UE 1800, such as the processor 1810 executing program code stored in program memory 1820 in conjunction with, and/or supported by, data memory 1830.

User interface 1850 can take various forms depending on the particular embodiment of UE 1800, or can be absent from UE 1800 entirely. In some embodiments, user interface 1850 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1800 can comprise a tablet computing device including a larger touchscreen display. In such embodiments, one or more of the mechanical features of the user interface 1850 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1800 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1800 having a touch screen display are capable of receiving user inputs, such as inputs related to exemplary methods and/or procedures described herein or otherwise known to persons of ordinary skill in the art.

In some embodiments, UE 1800 can include an orientation sensor, which can be used in various ways by features and functions of UE 1800. For example, the UE 1800 can use outputs of the orientation sensor to determine when a user has changed the physical orientation of the UE 1800's touch screen display. An indication signal from the orientation sensor can be available to any application program executing on the UE 1800, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1860 of the UE 1800 can take various forms depending on the particular exemplary embodiment of UE 1800 and of the particular interface requirements of other devices that the UE 1800 is intended to communicate with and/or control. For example, the control interface 1860 can comprise an RS-232 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1860 can comprise an IEEE 802.3 Ethernet interface such as described above. In some exemplary embodiments of the present disclosure, the control interface 1860 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1800 can comprise more functionality than is shown in FIG. 18 including, for example, a video and/or still-image camera, microphone, media player and/or recorder, etc. Moreover, radio transceiver 1840 can include circuitry necessary to communicate using additional radio-frequency communication standards including Bluetooth, GPS, and/or others. Moreover, the processor 1810 can execute software code stored in the program memory 1820 to control such additional functionality. For example, directional velocity and/or position estimates output from a GPS receiver can be available to any application program executing on the UE 1800, including various exemplary methods and/or computer-readable media according to various exemplary embodiments of the present disclosure.

Figure 19:
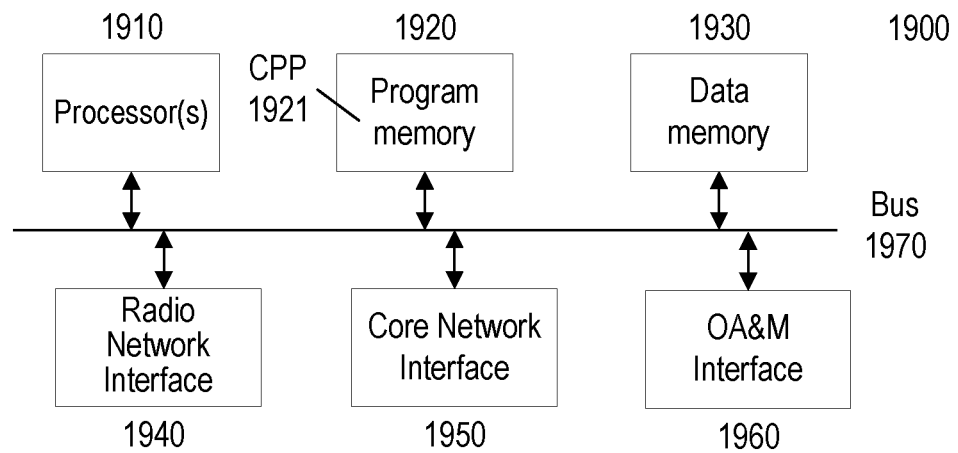
FIG. 19 shows a block diagram of an exemplary network node, according to various embodiments of the present disclosure.

FIG. 19 shows a block diagram of an exemplary network node 1900 according to various embodiments of the present disclosure, including those described above with reference to other figures. For example, exemplary network node 1900 can be configured by execution of instructions, stored on a computer-readable medium, to perform operations corresponding to one or more of the exemplary methods and/or procedures described above. In some exemplary embodiments, network node 1900 can comprise a base station, eNB, gNB, or one or more components thereof. For example, network node 1900 can be configured as a central unit (CU) and one or more distributed units (DUs) according to NR gNB architectures specified by 3GPP. More generally, the functionally of network node 1900 can be distributed across various physical devices and/or functional units, modules, etc.

Network node 1900 can include processor 1910 (also referred to as "processing circuitry") that is operably connected to program memory 1920 and data memory 1930 via bus 1970, which can include parallel address and data buses, serial ports, or other methods and/or structures known to those of ordinary skill in the art.

Program memory 1920 can store software code, programs, and/or instructions (collectively shown as computer program product (CPP) 1921 in FIG. 19) that, when executed by processor 1910, can configure and/or facilitate network node 1900 to perform various operations. For example, execution of such stored instructions can configure network node 1900 to communicate with one or more other devices using protocols according to various embodiments of the present disclosure, including one or more exemplary methods and/or procedures discussed above. Program memory 1920 can also comprise software code executed by processor 1910 that can facilitate and specifically configure network node 1900 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1940 and core network interface 1950. By way of example and without limitation, core network interface 1950 can comprise the S1 interface and radio network interface 1940 can comprise the Uu interface, as standardized by 3GPP. Program memory 1920 can further comprise software code executed by processor 1910 to control the functions of network node 1900, including configuring and controlling various components such as radio network interface 1940 and core network interface 1950.

Data memory 1930 can comprise memory area for processor 1910 to store variables used in protocols, configuration, control, and other functions of network node 1900. As such, program memory 1920 and data memory 1930 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1910 can include multiple individual processors (not shown), each of which implements a portion of the functionality described above. In such case, multiple individual processors may be commonly connected to program memory 1920 and data memory 1930 or individually connected to multiple individual program memories and/or data memories. More generally, persons of ordinary skill will recognize that various protocols and other functions of network node 1900 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1940 can comprise transmitters, receivers, signal processors, ASICs, antennas, beamforming units, and other circuitry that enables network node 1900 to communicate with other equipment such as, in some embodiments, a plurality of compatible user equipment (UE). In some embodiments, interface 1940 can also enable network node 1900 to communicate with compatible satellites of a satellite communication network. In some exemplary embodiments, radio network interface 1940 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1940. According to further exemplary embodiments of the present disclosure, the radio network interface 1940 can comprise a PHY layer based on OFDM, OFDMA, and/or SC-FDMA technologies. In some embodiments, the functionality of such a PHY layer can be provided cooperatively by radio network interface 1940 and processor 1910 (including program code in memory 1920).

Core network interface 1950 can comprise transmitters, receivers, and other circuitry that enables network node 1900 to communicate with other equipment in a core network such as, in some embodiments, circuit-switched (CS) and/or packet-switched Core (PS) networks. In some embodiments, core network interface 1950 can comprise the S1 interface standardized by 3GPP. In some embodiments, core network interface 1950 can comprise the NG interface standardized by 3GPP. In some exemplary embodiments, core network interface 1950 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1950 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1900 can include hardware and/or software that configures and/or facilitates network node 1900 to communicate with other network nodes in a RAN, such as with other eNBs, gNBs, ng-eNBs, en-gNBs, IAB nodes, etc. Such hardware and/or software can be part of radio network interface 1940 and/or core network interface 1950, or it can be a separate functional unit (not shown). For example, such hardware and/or software can configure and/or facilitate network node 1900 to communicate with other RAN nodes via the X2 or Xn interfaces, as standardized by 3GPP.

OA&M interface 1960 can comprise transmitters, receivers, and other circuitry that enables network node 1900 to communicate with external networks, computers, databases, and the like for purposes of operations, administration, and maintenance of network node 1900 or other network equipment operably connected thereto. Lower layers of OA&M interface 1960 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1940, core network interface 1950, and OA&M interface 1960 may be multiplexed together on a single physical interface, such as the examples listed above.

Figure 20:
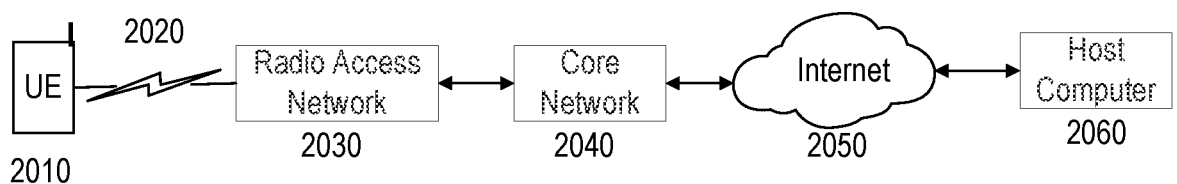
FIG. 20 shows a block diagram of an exemplary network configured to provide over-the-top (OTT) data services between a host computer and a UE, according to various embodiments of the present disclosure.

FIG. 20 is a block diagram of an exemplary communication network configured to provide over-the-top (OTT) data services between a host computer and a user equipment (UE), according to one or more exemplary embodiments of the present disclosure. UE 2010 can communicate with radio access network (RAN) 2030 over radio interface 2020, which can be based on protocols described above including, e.g., LTE, LTE-A, and 5G/NR. For example, UE 2010 can be configured and/or arranged as shown in other figures discussed above.

RAN 2030 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 2030 can cooperatively operate using licensed and unlicensed spectrum. In some embodiments, RAN 2030 can include, or be capable of communication with, one or more satellites comprising a satellite access network.

RAN 2030 can further communicate with core network 2040 according to various protocols and interfaces described above. For example, one or more apparatus (e.g., base stations, eNBs, gNBs, etc.) comprising RAN 2030 can communicate to core network 2040 via core network interface 1650 described above. In some exemplary embodiments, RAN 2030 and core network 2040 can be configured and/or arranged as shown in other figures discussed above. For example, eNBs comprising an E-UTRAN 2030 can communicate with an EPC core network 2040 via an S1 interface, such as shown in FIG. 1. As another example, gNBs comprising a NR RAN 2030 can communicate with a 5GC core network 2030 via an NG interface.

Core network 2040 can further communicate with an external packet data network, illustrated in FIG. 20 as Internet 2050, according to various protocols and interfaces known to persons of ordinary skill in the art. Many other devices and/or networks can also connect to and communicate via Internet 2050, such as exemplary host computer 2060. In some exemplary embodiments, host computer 2060 can communicate with UE 2010 using Internet 2050, core network 2040, and RAN 2030 as intermediaries. Host computer 2060 can be a server (e.g., an application server) under ownership and/or control of a service provider. Host computer 2060 can be operated by the OTT service provider or by another entity on the service provider's behalf.

For example, host computer 2060 can provide an over-the-top (OTT) packet data service to UE 2010 using facilities of core network 2040 and RAN 2030, which can be unaware of the routing of an outgoing/incoming communication to/from host computer 2060. Similarly, host computer 2060 can be unaware of routing of a transmission from the host computer to the UE, e.g., the routing of the transmission through RAN 2030. Various OTT services can be provided using the exemplary configuration shown in FIG. 20 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 20 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein can facilitate UE reporting of additional status information of one or more non-cellular receivers that correspond to the one or more types of non-cellular signals that are identified by the network in a measurement reporting configuration. By receiving such information, the network can determine whether to use UE measurement reports that do not include certain non-cellular measurements configured by the network. This can improve a network's ability to perform remedial actions for cells in which a reported failure occurs, which can reduce and/or eliminate subsequent failures in such cells. Such techniques can make minimization of drive testing (MDT) procedures more robust by providing additional measurement information. In this manner, embodiments can improve reliability of wireless networks. When used in UEs (e.g., UE 2010) and network nodes (e.g., comprising RAN 2030), embodiments described herein can improve reliability of RAN 2030. These reliability improvements can benefit end-users and providers of OTT services that utilize RAN 2030, thereby increasing the value of such services to these parties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein include, but are not limited to, the following enumerated examples:

A1. A method for a user equipment (UE) operating in a cellular radio access network (RAN), the method comprising:
   receiving, from the cellular RAN, a measurement reporting configuration comprising:
      identification of non-cellular signals, of one or more types, for which measurements are requested from the UE, and
      a request that the UE should report status of one or more non-cellular receivers that correspond to the one or more types of identified non-cellular signals;
   measuring at least the identified non-cellular signals; and
   transmitting, to the cellular RAN, a measurement report including one or more of the following for each particular type of identified non-cellular signal:
      a first indication of whether the UE's corresponding non-cellular receiver was enabled during a measurement duration, and
      a second indication of whether the UE was out-of-coverage during the measurement duration in relation to all identified non-cellular signals of the particular type.

A1a. The method of embodiment A1, wherein the measurement duration is included in the measurement reporting configuration.

A2. The method of any of embodiments A1-A1a, wherein measuring at least the identified non-cellular signals comprises selectively measuring the identified non-cellular signals of each particular type based on:
   whether the UE's corresponding non-cellular receiver is enabled during the measurement duration, and
   whether the identified non-cellular signals can be received by the corresponding non-cellular receiver during the measurement duration.

A3. The method of any of embodiments A1-A2, wherein, for each particular type, when the UE's corresponding non-cellular receiver was enabled during the measurement duration, the second indication is included in the measurement report and the first indication is not included in the measurement report.

A4. The method of embodiment A3, wherein, for each particular type, when the UE's corresponding non-cellular receiver was enabled during the measurement duration, the second indication comprises a variable having a first value indicating the UE was out-of-coverage in relation to all identified non-cellular signals of the particular type.

A5. The method of embodiment A4, wherein, for each particular type, when the UE's corresponding non-cellular receiver was enabled during the measurement duration, the second indication further comprises one of the following indicating the UE was in-coverage in relation to at least one identified non-cellular signal of the particular type:
   a second value of the variable; or
   measurements of the at least one identified non-cellular signal.

A6. The method of any of embodiments A1-A5, wherein:
   the one or more types of non-cellular signals include any of the following: wireless LAN (WLAN) and Bluetooth (BT); and
   the identification of the non-cellular signals includes one or more of the following:
      a first list of WLAN access point identifiers, and
      a second list of BT beacon identifiers.

A7. The method of any of embodiments A1-A6, wherein measuring at least the identified non-cellular signals further comprises selectively measuring global navigation satellite system (GNSS) signals based on:
   whether the UE's GNSS receiver is enabled during the measurement duration, and
   whether GNSS signals can be received by the UE's GNSS receiver during the measurement duration.

A8. The method of embodiment A7, wherein the measurement report also includes one or more of the following:
   a third indication of whether the UE's GNSS receiver was enabled during the measurement duration, and
   a fourth indication of whether the UE was out-of-coverage during the measurement duration in relation to GNSS signals.

A9. The method of embodiment A8, wherein when the UE's GNSS receiver was enabled during the measurement duration, the fourth indication is included in the measurement report and the third indication is not included in the measurement report.

A10. The method of embodiment A9, wherein when the UE's GNSS receiver was enabled during the measurement duration, the fourth indication comprises a variable having a first value indicating the UE was out-of-coverage in relation to GNSS signals.

A11. The method of embodiment A10, wherein when the UE's GNSS receiver was enabled during the measurement duration, the fourth indication further comprises one of the following indicating the UE was in-coverage in relation to GNSS signals:
   a second value of the variable; or
   a UE location based on measurements of the GNSS signals.

A12. The method of any of embodiments A1-A11, wherein:
   the identified non-cellular signals at least partially overlap in coverage with one or more cells of the RAN; and
   the measurement report also includes measurements for the one or more cells of the RAN A13. The method of any of embodiments A1-A12, wherein the measurement reporting configuration is received while the UE's connection to the cellular RAN is in an active state.

A14. The method of embodiment A13, wherein measuring at least the identified non-cellular signals is performed while the UE's connection to the cellular RAN is in the active state.

A15. The method of embodiment A13, wherein:
the method further comprises changing the UE's connection to the cellular RAN to a non-active state; and
the measurement report is transmitted after changing the connection to the cellular RAN back to the active state.

A16. The method of embodiment A15, wherein:
the measurement duration comprises a plurality of logging intervals while the UE's connection to the cellular RAN is in the non-active state; and
measuring at least the identified non-cellular signals is performed at the plurality of logging intervals.

A17. The method of embodiment A16, wherein the measurement report includes one or more of the following for each particular logging interval and for each particular type of identified non-cellular signal:
a first indication of whether the corresponding non-cellular receiver was enabled during the particular logging interval, and
a second indication of whether the UE was out-of-coverage during the particular logging interval in relation to all identified non-cellular signals of the particular type.

A18. The method of embodiment A15, wherein:
the method further comprises declaring a connection establishment failure (CEF) while attempting to change the UE's connection to the cellular RAN back to the active state;
measuring at least the identified non-cellular signals is performed during a period immediately before the CEF; and
the measurement report is transmitted after subsequently changing the connection to the cellular RAN back to the active state.

A19. The method of embodiment A13, wherein:
the method further comprises declaring a radio link failure (RLF) for the UE's connection to the cellular RAN; and
measuring at least the identified non-cellular signals is performed during a period immediately before the RLF.

A20. The method of embodiment A19, wherein the measurement report is transmitted upon reestablishing the connection to the cellular RAN after the RLF.

A21. The method of embodiment A19, wherein:
the UE's connection to the cellular RAN is dual connectivity with a master node (MN) and with a secondary node (SN);
the measurement configuration is received from one or more of the MN and the SN;
declaring the RLF for the connection comprises declaring the RLF for one of the MN and the SN; and
the measurement report is transmitted as a failure information message to the other of the MN and SN.

B1. A method for a network node in a cellular radio access network (RAN), the method comprising:
transmitting, to a user equipment (UE), a measurement reporting configuration comprising:
identification of non-cellular signals, of one or more types, for which measurements are requested from the UE, and
an indication that the UE should report status of one or more non-cellular receivers that correspond to the one or more types of identified non-cellular signals; and
receiving, from the UE, a measurement report including one or more of the following for each particular type of identified non-cellular signal:
a first indication of whether the UE's corresponding non-cellular receiver was enabled during the measurement duration, and
a second indication of whether the UE was out-of-coverage during the measurement duration in relation to all identified non-cellular signals of the particular type.

B1a. The method of embodiment B1, wherein the measurement duration is included in the measurement reporting configuration.

B2. The method of any of embodiments B1-B1a, wherein, for each particular type, when the UE's corresponding non-cellular receiver was enabled during the measurement duration, the second indication included in the measurement report and the first indication is not included in the measurement report.

B3. The method of embodiment B2, wherein, for each particular type, when the UE's corresponding non-cellular receiver was enabled during the measurement duration, the second indication comprises a variable having a first value indicating the UE was out-of-coverage in relation to all identified non-cellular signals of the particular type.

B4. The method of embodiment B3, wherein, for each particular type, when the UE's corresponding non-cellular receiver was enabled during the measurement duration, the second indication further comprises one of the following indicating the UE was in-coverage in relation to at least one identified non-cellular signal of the particular type:
a second value of the variable; or
measurements of the at least one identified non-cellular signal.

B5. The method of any of embodiments B1-B4, wherein:
the one or more types of non-cellular signals include any of the following: wireless LAN (WLAN) and Bluetooth (BT); and
the identification of the non-cellular signals includes one or more of the following:
a first list of WLAN access point identifiers, and
a second list of BT beacon identifiers.

B6. The method of any of embodiments B1-B5, wherein the measurement report also includes one or more of the following:
a third indication of whether the UE's global navigation satellite system (GNSS) receiver was enabled during the measurement duration, and
a fourth indication of whether the UE was out-of-coverage during the measurement duration in relation to GNSS signals.

B7. The method of embodiment B6, wherein when the UE's GNSS receiver was enabled during the measurement duration, the fourth indication is included in the measurement report and the third indication is not included in the measurement report.

B8. The method of embodiment B7, wherein when the UE's GNSS receiver was enabled during the measurement duration, the fourth indication comprises a variable having a first value indicating the UE was out-of-coverage in relation to GNSS signals.

B9. The method of embodiment B8, wherein when the UE's GNSS receiver was enabled during the measurement duration, the fourth indication further comprises one of the following indicating the UE was in-coverage in relation to GNSS signals:
  a second value of the variable; or
  a UE location based on measurements of the GNSS signals.

B10. The method of any of embodiments B1-B9, wherein:
  the identified non-cellular signals at least partially overlap in coverage with one or more cells of the RAN; and
  the measurement report further comprises measurements for the one or more cells of the RAN.

B11. The method of any of embodiments B1-B10, wherein the measurement reporting configuration is transmitted while the UE's connection to the cellular RAN is in an active state.

B12. The method of embodiment B11, wherein the measurement duration is while the UE's connection to the cellular RAN is in the active state.

B13. The method of embodiment B11, wherein:
  the method further comprises changing the UE's connection to the cellular RAN to a non-active state; and
  the measurement report is received after changing the UE's connection to the cellular RAN back to the active state.

B14. The method of embodiment B13, wherein:
  the measurement duration comprises a plurality of logging intervals while the UE's connection is in the non-active state; and
  the measurement report includes one or more of the following for each particular logging interval and for each particular type of identified non-cellular signal:
    a first indication of whether the UE's corresponding non-cellular receiver was enabled during the particular logging interval, and
    a second indication of whether the UE was out-of-coverage during the particular logging interval in relation to all identified non-cellular signals of the particular type.

B15. The method of embodiment B13, wherein:
  the measurement report indicates a connection establishment failure (CEF) that occurred when the UE attempted to change the connection to the cellular RAN back to the active state; and
  the measurement duration comprises a period immediately before the CEF.

B16. The method of embodiment B11, wherein:
  the measurement report indicates a radio link failure (RLF) that occurred when the UE's connection to the cellular RAN was in the active state; and
  the measurement duration comprises a period immediately before the RLF.

B17. The method of embodiment B16, wherein the measurement report is received upon reestablishing the UE's connection to the cellular RAN after the RLF.

B18. The method of embodiment B16, wherein:
  the UE's connection to the cellular RAN is dual connectivity with a master node (MN) and with a secondary node (SN);
  the measurement report indicates that the RLF occurred for one of the MN and SN; and
  the network node is the other of the MN and the SN.

B19. The method of any of embodiments B1-B18, further comprising, when the measurement report indicates that at least one UE non-cellular receiver, corresponding to at least one type of identified non-cellular signals, was not enabled during the measurement duration, discarding at least a portion of any of the following that are included in the measurement report:
  measurements of one or more cells of the RAN; and
  measurements of other types of identified non-cellular signals.

B20. The method of embodiment B19, wherein discarding is performed for one of the following:
  all included measurements; or
  only for included measurements in the same coverage area as the identified non-cellular signals of the at least one type.

B22. The method of any of embodiments B1-B18, further comprising, when the measurement report indicates that at least one UE non-cellular receiver, corresponding to at least one type of identified non-cellular signals, was not enabled during the measurement duration, combining the measurements included in the measurement report with measurements included in further measurement reports that include the same indication.

B23. The method of embodiment B22, wherein:
  the identification of the non-cellular signals includes a first list of wireless LAN (WLAN) access point identifiers and a second list of Bluetooth (BT) beacon identifiers; and
  the measurement report indicates that the UE's Bluetooth (BT) receiver was enabled and that the UE's wireless LAN (WLAN) receiver was not enabled during the measurement duration.

B24. The method of any of embodiments B1-B18, further comprising estimating one or more of the following based on the measurement report indicating that that at least one UE non-cellular receiver, corresponding to at least one type of identified non-cellular signals, was enabled but that the UE was out-of-coverage during the measurement duration in relation to all identified non-cellular signals of the at least one type:
  coverage of one or more cells in the RAN; and
  a location of the UE.

C1. A user equipment (UE) configured to operate in a cellular radio access network (RAN), the UE comprising:
  radio transceiver circuitry configured to communicate with one or more network nodes in the RAN; and
  processing circuitry operatively coupled to the transceiver circuitry, whereby the processing circuitry and the transceiver circuitry are configured to perform operations corresponding to any of the methods of embodiments A1-A21.

C2. A user equipment (UE) configured to operate in a cellular radio access network (RAN), the UE being further arranged to perform operations corresponding to any of the methods of embodiments A1-A21.

C3. A non-transitory, computer-readable medium storing computer-executable instructions that, when executed by processing circuitry of a user equipment (UE), configure the UE to perform operations corresponding to any of the methods of embodiments A1-A21.

C4. A computer program product comprising computer-executable instructions that, when executed by processing circuitry of a user equipment (UE), configure the UE to perform operations corresponding to any of the methods of embodiments A1-A21.

D1. A network node in a cellular radio access network (RAN), the network node comprising: radio network interface circuitry configured to communicate with one or more user equipment (UEs); and processing circuitry operatively coupled to the radio network interface circuitry, whereby the processing circuitry and the radio network interface circuitry are configured to perform operations corresponding to any of the methods of embodiments B1-B24.

D2. A network node in a cellular radio access network (RAN), the network node being further arranged to perform operations corresponding to any of the methods of embodiments B1-B24.

D3. A non-transitory, computer-readable medium storing computer-executable instructions that, when executed by processing circuitry of a network node in a cellular radio access network (RAN), configure the network node to perform operations corresponding to any of the methods of embodiments B1-B24.

D4. A computer program product comprising computer-executable instructions that, when executed by processing circuitry of a network node in a cellular radio access network (RAN), configure the network node to perform operations corresponding to any of the methods of embodiments B1-B24.

The invention claimed is:

1. A method for a user equipment (UE) configured to operate in a cellular radio access network (RAN), the method comprising:
   receiving, from the cellular RAN, a measurement reporting configuration comprising identification of non-cellular signals, of one or more types, for which measurements are requested from the UE;
   selectively measuring the identified non-cellular signals of each type during a measurement duration; and
   transmitting to the cellular RAN a measurement report that includes one or more of the following for each particular type of identified non-cellular signal:
      a first indication of whether the UE's non-cellular receiver corresponding to the particular type was enabled during the measurement duration, and
      a second indication of whether the UE was out-of-coverage during the measurement duration in relation to all identified non-cellular signals of the particular type, wherein:
      the first indication for each particular type is included in the measurement report when during the measurement duration, the UE's non-cellular receiver corresponding to at least one of the types of identified non-cellular signals was disabled; and
      the second indication for each particular type is included in the measurement report when during the measurement duration, the UE's non-cellular receiver corresponding to at least one of the types of identified non-cellular signals was enabled but the UE was out-of-coverage in relation to the identified non-cellular signals corresponding to the UE's enabled non-cellular receiver.

2. The method of claim 1, wherein the measurement reporting configuration also includes one or more of the following:
   the measurement duration; and
   a request for the UE to report status of one or more non-cellular receivers that correspond to the one or more types of identified non-cellular signals.

3. The method of claim 1, wherein selectively measuring the identified non-cellular signals of each type is based on:
   whether the UE's corresponding non-cellular receiver is enabled during the measurement duration, and
   whether the identified non-cellular signals can be received by the corresponding non-cellular receiver during the measurement duration.

4. The method of claim 1, wherein the identification of the non-cellular signals includes one or more of the following:
   a first list of wireless LAN (WLAN) access point identifiers; and
   a second list of Bluetooth beacon identifiers.

5. The method of claim 1, wherein:
   the identified non-cellular signals at least partially overlap in coverage with one or more cells of the RAN; and
   the measurement report also includes measurements for the one or more cells of the RAN.

6. The method of claim 1, wherein one or more of the following occurs while the UE's connection to the cellular RAN is in an active state:
   the measurement reporting configuration is received, and
   the measurement duration.

7. The method of claim 6, wherein:
   the method further comprises changing the UE's connection to the cellular RAN to a non-active state; and
   the measurement report is transmitted after changing the UE's connection to the cellular RAN from the non-active state back to the active state.

8. The method of claim 6, wherein the measurement duration is one of the following:
   a plurality of logging intervals while the UE's connection to the cellular RAN is in the non-active state;
   a period immediately before declaring a connection establishment failure while attempting to change the UE's connection to the cellular RAN back to the active state;
   a period immediately before declaring a radio link failure.

9. A method for a network node configured to operate in a cellular radio access network (RAN), the method comprising:
   transmitting, to a user equipment (UE), a measurement reporting configuration comprising identification of non-cellular signals, of one or more types, for which measurements are requested from the UE; and
   receiving, from the UE, a measurement report including one or more of the following for each particular type of identified non-cellular signal:
      a first indication of whether the UE's non-cellular receiver corresponding to the particular type was enabled during the measurement duration, and
      a second indication of whether the UE was out-of-coverage during the measurement duration in relation to all identified non-cellular signals of the particular type, wherein:
      the first indication for each particular type is included in the measurement report when during the measurement duration, the UE's non-cellular receiver corresponding to at least one of the types of identified non-cellular signals was disabled; and
      the second indication for each particular type is included in the measurement report when during the measurement duration, the UE's non-cellular receiver corresponding to at least one of the types of identified non-cellular signals was enabled but the UE was out-of-coverage in relation to the identified non-cellular signals.

10. The method of claim 9, wherein the measurement reporting configuration also includes one or more of the following:
    the measurement duration; and a request for the UE to report status of one or more non-cellular receivers that correspond to the one or more types of identified non-cellular signals.

11. The method of claim 9, wherein the identification of the non-cellular signals includes one or more of the following:
   a first list of wireless LAN (WLAN) access point identifiers; and
   a second list of Bluetooth beacon identifiers.

12. The method of claim 9, further comprising, when the measurement report indicates that at least one UE non-cellular receiver was not enabled during the measurement duration, combining the measurements included in the measurement report with measurements included in one or more further measurement reports indicating that the same at least one non-cellular receiver was enabled during respective further measurement durations.

13. A network node configured to operate in a cellular radio access network (RAN), the network node comprising:
   radio network interface circuitry configured to communicate with one or more user equipment (UEs); and
   processing circuitry operatively coupled to the radio network interface circuitry, whereby the processing circuitry and the radio network interface circuitry are configured to perform operations corresponding to the method of claim 9.

14. The network node of claim 13, wherein the processing circuitry and the radio network interface circuitry are further configured to, when the measurement report indicates that at least one UE non-cellular receiver was not enabled during the measurement duration, combine the measurements included in the measurement report with measurements included in one or more further measurement reports indicating that the same at least one non-cellular receiver was enabled during respective further measurement durations.

15. A user equipment (UE) configured to operate in a cellular radio access network (RAN), the UE comprising:
   radio transceiver circuitry configured to communicate with one or more network nodes in the RAN; and
   processing circuitry operatively coupled to the radio transceiver circuitry, whereby the processing circuitry and the transceiver circuitry are configured to:
      receive, from the cellular RAN, a measurement reporting configuration comprising identification of non-cellular signals, of one or more types, for which measurements are requested from the UE;
      selectively measure the identified non-cellular signals of each type during a measurement duration; and
      transmit to the cellular RAN a measurement report that includes one or more of the following for each particular type of identified non-cellular signal:
         a first indication of whether the UE's non-cellular receiver corresponding to the particular type was enabled during the measurement duration, and
         a second indication of whether the UE was out-of-coverage during the measurement duration in relation to all identified non-cellular signals of the particular type, wherein:
            the first indication for each particular type is included in the measurement report when during the measurement duration, the UE's non-cellular receiver corresponding to at least one of the types of identified non-cellular signals was disabled; and
            the second indication for each particular type is included in the measurement report when during the measurement duration, the UE's non-cellular receiver corresponding to at least one of the types of identified non-cellular signals was enabled but the UE was out-of-coverage in relation to the identified non-cellular signals corresponding to the UE's enabled non-cellular receiver.

16. The UE of claim 15, wherein the measurement reporting configuration also includes one or more of the following:
   the measurement duration; and
   a request for the UE to report status of one or more non-cellular receivers that correspond to the one or more types of identified non-cellular signals.

17. The UE of claim 15, wherein the identification of the non-cellular signals includes one or more of the following:
   a first list of wireless LAN (WLAN) access point identifiers; and
   a second list of Bluetooth beacon identifiers.

18. The UE of claim 15, wherein:
   the identified non-cellular signals at least partially overlap in coverage with one or more cells of the RAN; and
   the measurement report also includes measurements for the one or more cells of the RAN.

19. The UE of claim 15, wherein:
   one or more of the following occurs while the UE's connection to the cellular RAN is in an active state: the measurement reporting configuration is received, and the measurement duration;
   the method further comprises changing the UE's connection to the cellular RAN to a non-active state; and
   the measurement report is transmitted after changing the UE's connection to the cellular RAN from the non-active state back to the active state.

20. The UE of claim 15, wherein the measurement duration is one of the following:
   a plurality of logging intervals while the UE's connection to the cellular RAN is in the non-active state;
   a period immediately before declaring a connection establishment failure while attempting to change the UE's connection to the cellular RAN back to the active state;
   a period immediately before declaring a radio link failure.

* * * * *